(12) United States Patent
Nakai

(10) Patent No.: US 7,028,203 B2
(45) Date of Patent: *Apr. 11, 2006

(54) INFORMATION PROCESSING SYSTEM AND INFORMATION PROCESSING APPARATUS

(75) Inventor: Hidekazu Nakai, Tokyo (JP)

(73) Assignee: Sony Corporation, Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 10/971,449

(22) Filed: Oct. 22, 2004

(65) Prior Publication Data

US 2005/0097375 A1    May 5, 2005

Related U.S. Application Data

(62) Division of application No. 09/844,048, filed on Apr. 27, 2001, now Pat. No. 6,928,567.

(30) Foreign Application Priority Data

Apr. 28, 2000   (JP) ............................ P2000-134282

(51) Int. Cl.
*G06F 1/28* (2006.01)

(52) U.S. Cl. .................... 713/340; 713/320; 714/22; 369/47.28; 369/53.12

(58) Field of Classification Search ............... 713/300, 713/310, 320, 321, 323, 340; 360/79; 369/30.36, 369/53.1, 53.12, 53.16, 53.18; 711/163
See application file for complete search history.

(56) References Cited

U.S. PATENT DOCUMENTS

| | | | |
|---|---|---|---|
| 4,636,905 A * | 1/1987 | Morimoto et al. | 360/137 |
| 4,689,698 A * | 8/1987 | Ishikawa et al. | 360/69 |
| 5,305,460 A * | 4/1994 | Kaneko et al. | 711/163 |
| 5,349,668 A * | 9/1994 | Gladstein et al. | 713/340 |
| 5,436,438 A * | 7/1995 | Shikichi | 235/454 |
| 5,602,805 A * | 2/1997 | Chigita | 369/13.02 |
| 5,638,307 A * | 6/1997 | Kamimura et al. | 713/321 |
| 5,907,859 A * | 5/1999 | Shimada et al. | 711/112 |
| 5,944,828 A * | 8/1999 | Matsuoka | 713/323 |
| 6,487,149 B1 * | 11/2002 | Yokoi et al. | 369/47.25 |
| 6,631,101 B1 * | 10/2003 | Chan et al. | 369/30.36 |

* cited by examiner

*Primary Examiner*—Thuan Du
(74) *Attorney, Agent, or Firm*—Jay H. Maioli

(57) ABSTRACT

Battery information is transmitted from a recording and playback apparatus to a host computer. In the host computer, based on the time for which operation can be continued, corresponding to the current operating status and the remaining battery level that is included in stored battery information, a warning is output, the data of a cache memory is written, data writing prohibition is set, and a forced closing process is performed. With this construction, in a system formed of a portable recording and playback apparatus and a personal computer, a proper system operation corresponding to the remaining battery level of the recording and playback apparatus is obtained, and the data recorded in the recording medium is prevented from being destroyed as a result of operation stopping due to, for example, the remaining battery level becoming zero while recording.

20 Claims, 15 Drawing Sheets

| POWER-SUPPLY STATE | | CONTROL |
|---|---|---|
| AC ADAPTER CONNECTION | | READ/WRITE PERMITTED, POWER SAVING MODE NOT-SET (RELEASED) |
| BATTERY | FIRST STAGE | READ/WRITE PERMITTED, FIRST LEVEL POWER SAVING MODE SET |
| | | < BOUNDARY VALVE 1 > |
| | SECOND STAGE | READ/WRITE PERMITTED, SECOND LEVEL POWER SAVING MODE SET |
| | | < BOUNDARY VALVE 2 > |
| | THIRD STAGE | READ-ONLY PERMITTED (WRITE PROHIBITED), SECOND LEVEL POWER SAVING MODE SET; WARNING DISPLAY |
| | | < BOUNDARY VALVE 3 > |
| | FOURTH STAGE | FORCED CLOSING PROCESS |

DISK-AT-ONCE (DAO)

TRACK-AT-ONCE (TAO)

SESSION-AT-ONCE (SAO)

FIG. 6

| byte | \ bit 7 | 6 | 5 | 4 | 3 | 2 | 1 | 0 |
|---|---|---|---|---|---|---|---|---|
| 0 | Operation Code (D5h) ||||||||
| 1 | Reserved ||||||||
| 2 | Reserved ||| Page Code (000001b) |||||
| 3 | Reserved ||||||||
| 4 | Reserved ||||||||
| 5 | Reserved ||||||||
| 6 | Reserved ||||||||
| 7 | (MSB) Allocation Length ||||||||
| 8 | (LSB) ||||||||
| 9 | Reserved ||||||||
| 10 | Reserved ||||||||
| 11 | Reserved ||||||||

FIG. 7

| byte | bit 7 | 6 | 5 | 4 | 3 | 2 | 1 | 0 |
|---|---|---|---|---|---|---|---|---|
| 0 | Reserved | | | | Page Code (000001b) | | | |
| 1 | Page Length (28h) | | | | | | | |
| 2 | The kind of power supply which is connected physically at present and which can be used. <br><br> (Reserved) | | | | USB/1394 /PCMCIA BUS | Dry cell | Rechargeable battery | AC adapter |
| 3 | The kind of power supply which is actually being used at present. <br><br> (Reserved) | | | | USB/1394 /PCMCIA BUS | Dry cell | Rechargeable battery | AC adapter |
| 4 | The power supply which can be used when this drive reads data as a computer peripheral. <br><br> (Reserved) | | | | USB/1394 /PCMCIA BUS | Dry cell | Rechargeable battery | AC adapter |
| 5 | The power supply which can be used when this drive writes data as a computer peripheral. <br><br> (Reserved) | | | | USB/1394 /PCMCIA BUS | Dry cell | Rechargeable battery | AC adapter |

| | | ② ↓ | |
|---|---|---|---|
| 16 | Valid (MSB) | The time until full charge of the battery. (UNIT : minute) | |
| 17 | | | (LSB) |
| 18 | Valid (MSB) | The time that the drive can read the media at present movement and speed, when at a full charge. (UNIT : minute) | |
| 19 | | | (LSB) |
| 20 | Valid (MSB) | The time that the drive can write the media (CD-R/RW) at present movement and speed, when at a full charge. (UNIT : minute) | |
| 21 | | | (LSB) |
| 22 | Valid (MSB) | The time that the drive can play the Audio CDs when at a full charge. (UNIT : minute) | |
| 23 | | | (LSB) |
| 24 | Valid (MSB) | The time that the drive can read the media at present movement and speed with current capacity of the battery. (UNIT : minute) | |
| 25 | | | (LSB) |
| 26 | Valid (MSB) | The time that the drive can write the media (CD-R/RW) at present movement and speed with current capacity of the battery. (UNIT : minute) | |
| 27 | | | (LSB) |
| 28 | Valid (MSB) | The time that the drive can play the Audio CDs with current capacity of the battery. (UNIT : minute) | |
| 29 | | | (LSB) |

↓ ③

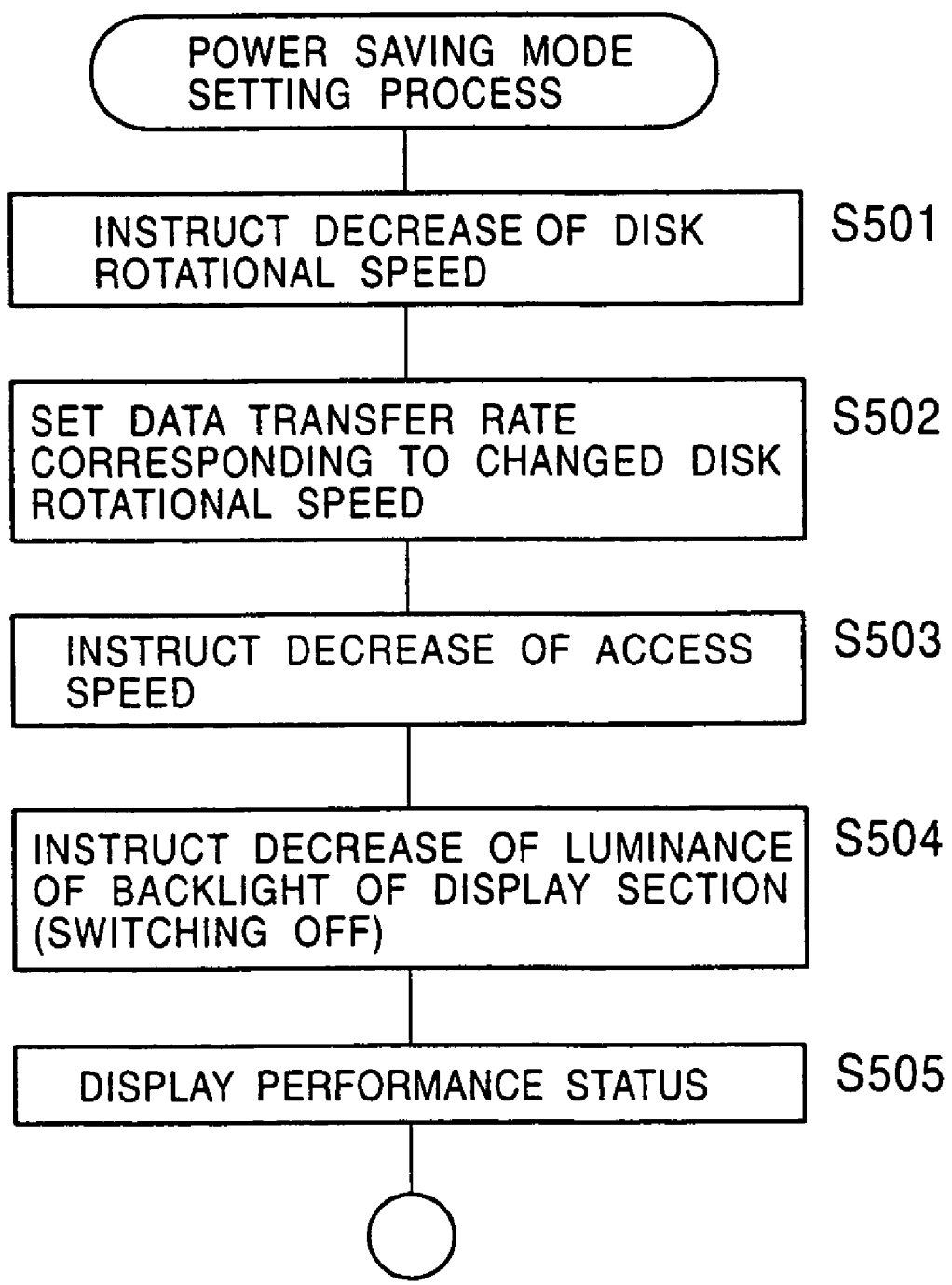

INFORMATION PROCESSING SYSTEM AND INFORMATION PROCESSING APPARATUS

This is a division of prior application Ser. No. 09/844,048 filed Apr. 27, 2001 now U.S. Pat. No. 6,928,567.

BACKGROUND OF THE INVENTION

1. Field of the Invention

The present invention relates to an information processing apparatus, such as, for example, a personal computer and peripheral devices thereof, and to an information processing system formed of these information processing apparatuses.

2. Description of the Related Art

In recent years, as a recording and playback apparatus, a CD-R/RW (Recordable/Rewritable) drive unit which performs recording and playback of data in accordance with a data recordable and playable disk, such as a recordable CD-R or a rewritable CD-RW, has become popular.

Although such a CD-R/RW drive unit, on a standalone basis, can play back a disk recorded independently in, for example, a CD-DA (Digital Audio) format, typically, the CD-R/RW drive unit is used as a peripheral device for a personal computer as a result of being connected to the personal computer via a data interface, such as, for example, USB, SCSI, etc.

As use forms thereof, as has already been well known, first, application software for controlling the CD-R/RW drive unit is installed on a personal computer. A user starts this application and performs operations on the personal computer, thereby making it possible to read data from a disk loaded into the CD-R/RW drive unit connected to this personal computer or to write data stored in the personal computer.

Also, in recent years, what is commonly called a notebook-type personal computer has become widely used. The notebook-type personal computer is smaller and lighter than, for example, what is commonly called a desktop-type personal computer, and furthermore, can be powered by a battery, in addition to an AC power supply, such as a charger. As a result, the notebook-type personal computer is more portable, and it is possible for the user to use the personal computer, for example, while on the move.

Against a background such as that described above, peripheral devices, such as, for example, CD-R/RW drive units described above, which are made smaller and lighter in order to be portable are also becoming popular. So, in order for higher portability to be obtained, a CD-R/RW drive unit to which power can be supplied by a charger, a dry battery, etc. has been proposed.

It is assumed that user data transferred from the personal computer side is being recorded into a CD-R/RW drive unit which is driven by, for example, a battery. At this time, if the remaining battery level of the CD-R/RW drive unit becomes zero, and the CD-R/RW drive unit stops operation, at this point in time, it is not possible for the personal computer side to complete the recording of a cluster of data which was being written at that time. More specifically, it is not possible to perform, for example, a closing process of what is commonly called a session. In such a case, since, on the disk, a file system for the data which has been actually written on the disk thus far does not exist, the data written up to that time is treated as not being present on the disk. That is, the user data which should have been written on the disk would be lost. In particular, for a rewritable CD-RW, depending on the recording method thereof, unless the file system is correctly written in the above-described manner, there may occur a case in which even data packets which were recorded previously is also not recognized and is lost.

In the manner described above, in a battery-driven CD-R/RW drive unit, when the remaining battery level becomes zero, the user data which has been written on the disk up to the present time is lost and the disk cannot be used. Therefore, there is a demand for measures for preventing this problem.

SUMMARY OF THE INVENTION

Accordingly, in view of the above-described problems, the present invention is first constructed as an information processing system as described below.

The present invention comprises at least a first information processing apparatus and a second information processing apparatus which are connected so as to be capable of communicating with each other.

The first information processing apparatus comprises a power-supply unit capable of supplying internal power by at least a battery; a power-supply information creation unit for creating power-supply information in which predetermined information about the power-supply unit is stored; and an information transmitter for transmitting the power-supply information to the second information processing apparatus.

The second information processing apparatus comprises a controller for performing control so as to obtain a predetermined operation in the information processing system based on the contents stored in the received power-supply information.

Furthermore, the present invention is constructed as an information processing apparatus as described below.

The information processing apparatus comprises a connector for connecting with another information processing apparatus so as to be capable of performing communication; a power-supply unit capable of supplying internal power by at least a battery; a power-supply information creation unit for creating power-supply information in which predetermined information about the power-supply unit is stored; an information transmitter for transmitting the power-supply information to the other information processing apparatus via the connector; and a controller capable of controlling the internal operations based on control information when the control information which is transmitted from the other information processing apparatus via the connector, is received.

In addition, the present invention is also constructed as an information processing apparatus as described below.

The information processing apparatus comprises a connector for connecting with another information processing apparatus to which internal power can be supplied by at least a battery in order to perform communication; and a controller for performing control so that a predetermined operation is performed in the information processing apparatus and/or the other information processing apparatus based on the contents stored in power-supply information when the power-supply information, in which predetermined information about power supply is stored, is received via the connector, the power-supply information being transmitted from the other information processing apparatus.

According to each of the above-described constructions, for the information processing system in which information processing apparatuses are connected so as to be capable of communicating with each other, power-supply information in which predetermined information about the power source is stored is transmitted from one of the information processing apparatuses (first information processing apparatus) to another information processing apparatus (second information processing apparatus). Here, since the first information processing apparatus can be battery-driven, predetermined information about this driving battery is also stored in the above-mentioned power-supply information.

Then, in the second information processing apparatus, based on the contents stored in the received power-supply information, it is possible to perform, for example, an internal control process and to perform control so that a predetermined operation can be obtained in the first information processing apparatus. That is, for example, with the second information processing apparatus serving as a central one, it becomes possible to perform an operation such that the first and second information processing apparatuses are coordinated according to the level of remaining battery of the first information processing apparatus.

The above and further objects, aspects and novel features of the invention will become more fully apparent from the following detailed description when read in conjunction with the accompanying drawings.

BRIEF DESCRIPTION OF THE DRAWINGS

FIG. 6 is an illustration showing the structure of a get battery information command;

FIGS. 7, 8, 9, and 10 are illustrations showing the structure of battery information;

FIG. 16 is a flowchart showing a processing operation for setting a power saving mode.

DESCRIPTION OF THE PREFERRED EMBODIMENTS

The embodiments of the present invention will now be described below.

An information processing system as an embodiment of the present invention comprises a host computer as an information processing apparatus, and a CD-R/RW drive unit, which is a recording and playback apparatus, which can perform a recording and playback in accordance with a CD-R and a CD-RW. The CD-R/RW drive unit of this embodiment can also play back read-only media in a commonly known CD format, such as CD-DA (Digital Audio), CD-ROM, etc.

Also, here, a USB (Universal Serial Bus) is used as a data interface for connecting the host computer with the CD-R/RW drive unit. That is, for example, in practice, a host computer 80 and a CD-R/RW drive unit 0 are physically connected to each other via a USB cable.

The descriptions which follow are given in the following sequence.

Figure 1:
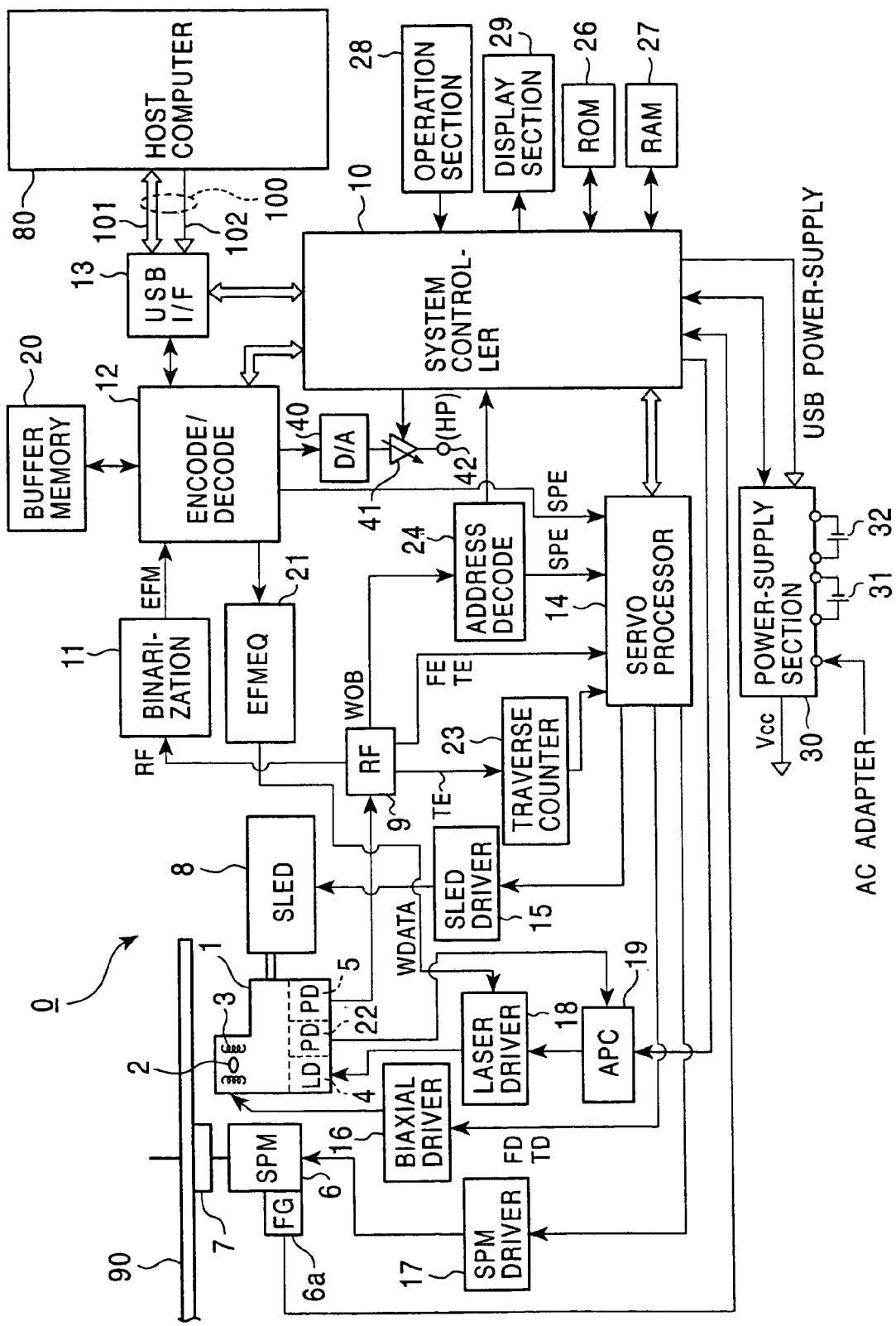
FIG. 1 is a block diagram showing an example of the internal construction of a CD-R/RW drive unit according to an embodiment of the present invention.

1. Information processing system
1-1. CD-R/RW drive unit
1-2. Host computer
2. Recording method
3. BATTERY INFORMATION
4. Operation during data recording and playback
5. Operation for each recording mode
1. Information Processing System
1-1. CD-R/RW Drive-Unit FIG. 1 shows the internal construction of a CD-R/RW drive unit which is used as a peripheral device in a system of this embodiment.

In this figure, a disk 90 is one of a CD-R, a CD-RW, a CD-DA, and a CD-ROM, which is compatible with the CD-R/RW drive unit 0, as described above.

As is well known, a CD-R is a write once type, and pits (recording marks) are formed as a result of laser light at a recording level being radiated onto a recording layer of an organic dye. A CD-RW is a medium which is rewritable by using a technique by which pits are formed by a phase change as a result of laser light being radiated thereto. Also, a CD-DA and a CD-ROM are read-only, and data is recorded by physically embossed pits.

The disk 90 is driven to rotate at a constant linear velocity (CLV) or at a constant angular velocity (CAV) by a spindle motor 6, during a recording/playback operation in a state in which the disk 90 is placed on a turn table 7 and is chucked. Then, pit data (phase change pits or pits by an organic dye change (reflectance change)) on the disk 90 is read by an optical pickup 1. In the case of a CD-DA and a CD-ROM, pits are embossed pits.

The spindle motor 6 is provided with a frequency generator (FG) 6a for detecting the rotational period thereof. This FG 6a outputs one pulse at intervals of a predetermined rotational angle of the spindle motor 6.

Inside the optical pickup 1, a laser diode 4 which is the laser light source, a photodetector 5 for detecting reflected light, an objective lens 2 which is the output end of the laser light, and an optical system (not shown) for radiating laser light onto a disk recording surface via the objective lens 2 and for guiding the reflected light to the photodetector 5, are formed.

Furthermore, a monitor detector 22 for detecting part of the light output from the laser diode 4 is also provided.

The objective lens 2 is held by a biaxial mechanism 3 in such a manner so as to be movable in the tracking direction and in the focusing direction. The entire pickup 1 is movable in the radial direction of the disk by a sled mechanism 8. The laser diode 4 in the optical pickup 1 is driven to emit a laser light in accordance with a driving signal (driving current) from a laser driver 18.

The reflected light information from the disk 90 is detected by the photodetector 5, and is changed into an electrical signal corresponding to the amount of received light, and is supplied to an RF amplifier 9.

The RF amplifier 9 comprises a current-voltage conversion circuit, a matrix computation/amplification circuit, etc., in such a manner so as to correspond to a current which is output from a plurality of light-receiving elements as the photodetectors 5, and generates a necessary signal from a matrix computation process. For example, an RF signal which contains playback data, a focusing error signal FE for servo control, a tracking error signal TE, etc., are generated.

The regenerated RF signal output from the RF amplifier 9 is supplied to a binarization circuit 11, and the focusing error signal FE and the tracking error signal TE are supplied to a servo processor 14.

The RF signal and the tracking error signal TE are also supplied to a traverse counter 23. In the traverse counter 23, as will be described later, based on the waveform of the tracking error signal TE, the number of tracks traversed by the laser spot radiated onto the disk 90 is detected, and the information about the number of traversed tracks is output to the servo processor 14. The information about the number of traversed tracks is used to determine, for example, the traveled distance during seek.

Also, on the disk 90 as a CD-R or a CD-RW, as is well known, grooves, which are recording track guides, are formed in advance and, furthermore, the grooves are made to wobble (meander) in accordance with a signal in which time information indicating an absolute address on the disk is FM-modulated. Therefore, during a recording operation, it is possible to use a tracking servo based on the information of the groove, and to obtain the absolute address from the wobble information of the groove. The RF amplifier 9 extracts wobble information WOB (ATIP signal) by a matrix computation process and supplies this information to an address decoder 24.

In the address decoder 24, the absolute address information is obtained by demodulating the supplied wobble information WOB (ATIP signal), and this information is output to a system controller 10. It is also possible for the address decoder 24 to extract various control information contained in the wobble information WOB (ATIP signal) and to output it to the system controller 10.

Also, by inputting the groove information into a PLL circuit, the rotational speed information of the spindle motor 6 is obtained, and furthermore, by comparing that information with the reference speed information, a spindle error signal SPE is generated and output.

The regenerated RF signal obtained by the RF amplifier 9 is binarized by the binarization circuit 11 so as to be formed into what is commonly called an EFM signal (8–14 modulation signal) and this signal is supplied to an encoding/decoding section 12.

The encoding/decoding section 12 comprises a decoder function part during playback and an encoder function part during recording.

During playback, as a decoding process, processing, such as EFM demodulation, CIRC error correction, deinterleaving, CD-ROM decoding, etc., is performed to obtain playback data which has been converted into CD-ROM format data.

Furthermore, the encoding/decoding section 12 also performs a subcode extraction process on the data read from the disk 90, and supplies TOC as a subcode (Q data), the address information, etc., to the system controller 10.

In addition, the encoding/decoding section 12 generates, from a PLL process, a playback clock synchronized with the EFM signal, and based on the playback clock, performs the above-mentioned decoding process. By obtaining the rotational speed information of the spindle motor 6 on the basis of the playback clock, and by comparing the information with the reference speed information, it is possible to generate a spindle error signal SPE and to output it.

During playback, the encoding/decoding section 12 stores the data which is decoded in the above-described manner in the buffer memory 20.

For the playback output from this drive unit, the data which is buffered in the buffer memory 20 is read, and is transferred for output.

A USB interface 13 is connected to the external host computer 80 via a USB bus 100, so that recording data, playback data, various commands, etc., are communicated with the host computer 80. Then, during playback, the playback data which is decoded and stored in the buffer memory 20 is transferred and output to the host computer 80 via the interface section 13. A read command, a write command, and other signals from the host computer 80 are supplied to the system controller 10 via the USB interface 13.

The USB bus 100, physically, connects the connector of the USB interface 13 of the CD-R/RW drive unit 0 with the connector of the USB interface on the host computer 80 side through a USB cable. Also, as is well known, the USB interface is capable of supplying, together with data, DC power from the host side to the peripheral device side. Therefore, as shown in the figure, the USB bus 100 is formed by a data bus 101 through which data is transmitted, and a power bus 102 for transmitting power.

Here, although a USB interface is used for communication with the host computer 80, the interface is not limited thereto, and SCSI, IEEE 1394, ATAPI (ATA Packet Interface) (IDE) interfaces, etc., may be employed.

In a case where audio data is being played back, that is, in a case where playback of a CD-R (and a CD-RW) in which audio data is recorded in the same format as that of a CD-DA, is being performed, a case is also possible in which, for example, the data which is decoded by the encoding/decoding section 12 and is stored in the buffer memory 20, is made to go through the encoding/decoding section 12 (in the case of this figure), after the data is converted into an analog audio signal via, for example, a D/A converter 40, amplification and sound volume adjustment are performed thereon by a variable amplifier 41, and the signal is output to a headphone terminal 42 which is an audio out terminal. The sound volume adjustment in the variable amplifier 41 is controlled by a system controller 10 in response to, for example, an operation performed on an operational element for volume adjustment, which is provided in the operation section 28.

On the other hand, during recording, recording data (audio data, CD-ROM data, and user data such as various files) is transferred from the host computer 80. The recording data is sent from the interface section 13 to the buffer memory 20 whereby the data is buffered.

In this case, as a process for encoding the buffered recording data, the encoding/decoding section 12 performs a process for encoding CD-ROM format data into CD format data (when the supplied data is CD-ROM data), CIRC encoding, interleaving, subcode addition, EFM modulation, etc.

The EFM signal obtained by the encoding process in the encoding/decoding section 12 is subjected to a process called "write equalization" in an equalizer 21, after which it is sent as write data WDATA to the laser driver 18, and is written on the disk. That is, the laser driver 18 supplies laser driving pulses, modulated by the write data WDATA, to the laser diode 4 so as to perform laser light emission driving, thereby forming pits (phase change pits or dye change pits) corresponding to the write data WDATA, on the disk 90.

An auto power control (APC) circuit 19 is a circuit section for performing control so that the output of the laser becomes constant regardless of the temperature, etc., while monitoring the laser output power by the output of the monitor detector 22. The target value of the laser output is supplied from the system controller 10, and the laser driver 18 is controlled so that the laser output level is at the target value.

Based on the focusing error signal FE and the tracking error signal TE from the RF amplifier 9, and the spindle error signal SPE from the encoding/decoding section 12 or the address decoding section 24, and so on, the servo processor 14 generates various servo driving signals, such as focusing, tracking, sled, and spindle so as to cause a servo operation to be performed.

More specifically, in response to the focusing error signal FE and the tracking error signal TE, a focusing driving signal FD and a tracking driving signal TD are generated and are supplied to a biaxial driver 16. The biaxial driver 16 drives a focusing coil and a tracking coil of the biaxial mechanism 3 in the pickup 1. As a result, a tracking servo loop and a focusing servo loop by the pickup 1, the RF amplifier 9, the servo processor 14, the biaxial driver 16, and the biaxial mechanism 3 are formed.

Furthermore, in response to a track jump instruction from the system controller 10, the tracking servo loop is turned off, and a jump driving signal is output to the biaxial driver 16, so that a track jump operation is performed.

The servo processor 14 further supplies a spindle driving signal generated in response to the spindle error signal SPE to the spindle motor driver 17. In response to the spindle driving signal, the spindle motor driver 17 applies, for example, a three-phase driving signal to the spindle motor 6 so that the CLV rotation of the spindle motor 6 is performed. Also, the servo processor 14 generates a spindle driving signal in response to a spindle kicking/braking control signal from the system controller 10 so that operations, such as starting, stopping, acceleration, deceleration, etc., of the spindle motor 6 by the spindle motor driver 17, are also performed.

Furthermore, the servo processor 14 generates a sled driving signal based on, for example, a sled error signal obtained as lower frequency components of the tracking error signal TE and based on access execution control, etc., from the system controller 10, and supplies the signal to a sled driver 15. The sled driver 15 drives the sled mechanism 8 in response to the sled driving signal. The sled mechanism 8 is a mechanism formed by a main shaft for holding the pickup 1, a sled motor, a transmission gear, etc. (not shown). The sled driver 15 drives the sled mechanism 8 in response to the spindle driving signal, causing predetermined sliding movement of the pickup 1 to be performed.

The various operations of the servo system and the recording and playback system, such as those described above, are controlled by the system controller 10 formed by a microcomputer. The system controller 10 performs various processing in response to a command from the host computer 80.

For example, in a case where a playback command for requesting the transfer of particular data recorded on the disk 90 is supplied from the host computer 80, a seek operation control is performed first by using the specified address as a target. That is, an instruction is given to the servo processor 14 so that an access operation of the pickup 1, in which the address specified by the seek command is the target, is performed.

Thereafter, operation control required to transfer the data of that specified data interval to the host computer 80 is performed. That is, reading/decoding/buffering, etc., of data from the disk 90 are performed to transfer requested data.

Also, when a writing command (recording command) is issued from the host computer 80, the system controller 10 first causes the pickup 1 to move to an address where writing is performed. Then, an encoding process is performed by the encoding/decoding section 12 on the data transferred from the host computer 80 in the manner described above, forming an EFM signal.

Then, the write data WDATA, on which equalization is performed in the manner described above, is supplied to the laser driver 18, causing the recording to be performed.

Here, it is possible for the system controller 10 to set reference speed information into the servo processor 14, and the servo processor 14 compares the set reference speed information with the rotational speed information from the decoder 12 in order to generate a spindle error signal SPE. Furthermore, by changing the setting of the reference speed information, the disk rotation driving speed can be changed and set. That is, in the case of playback, playback becomes possible at a predetermined multiple of single speed, which is higher than a single speed. At this time, the playback clock obtained as a result of the PLL circuit being operated in the encoding/decoding section 12, is made to have a frequency corresponding to the set multiple of single speed, so that signal processing corresponding to playback at the multiple of single speed is performed.

Also, during recording, in a case where the disk rotation driving speed is made to be a multiple of single speed, which is higher than a single speed, as a clock for recording, a frequency corresponding to the set multiple of single speed is set. The encoding process in the encoding/decoding section 12 and the signal processing in the equalizer 21 are performed in accordance with this clock. Then, the write data WDATA processed in this manner is supplied to the laser driver 18, thereby the recording onto the disk is performed at a writing rate corresponding to the set disk rotation driving speed.

An operation section 28 is formed by keys for performing an operation on the CD-R/RW drive unit 0. In this case, for example, a power key, an eject key, etc., are provided. Also, a key for playback is provided for a CD-R/RW drive unit 0 of this embodiment which can play back a CD-DA by itself, without depending on the control from the host computer 80. An operation information signal obtained in response to an operation on this operation section 28 is supplied to the system controller 10, and the system controller 10 performs a predetermined control process, as appropriate, in response to this operation information signal.

A display section 29 comprises, for example, an LCD (Liquid-Crystal Display). As a result of the display section 29 being driven under the control of the system controller 10, a display of the contents corresponding to the current operating state is produced. Also, the system controller 10 performs control which is related to the switching on of the backlight in the LCD of the display section 29.

A power-supply section 30 is provided to supply, to each function circuit section inside the CD-R/RW drive unit 0, a DC voltage which is stabilized at a predetermined power-supply voltage level.

Here, the DC power source which is supplied from an AC adapter, a charger, or a dry battery, can be input into the power-supply section 30 of this embodiment. In the case of this embodiment, the charger and the dry battery are housed in battery holders provided in the main unit, wherein such battery holders are provided at respectively different positions for the charger and the dry battery. Furthermore, in the case of this embodiment, a DC power source supplied from the host computer 80 side via the power bus 102 of the USB bus 100 can also be input. Then, in the power-supply section 30, from among these power sources which are currently physically connected, a suitable power source is selected as appropriate and is input, and the input power source is used to supply the DC power-supply to the interior.

In the CD-R/RW drive unit 0 of this embodiment, however, the amount of current consumption is increased to 500 mA or more, for example, at the time of the starting of the rotation of the spindle motor. In comparison, the power which can be supplied via the USB interface is 5 V/500 mA. As a result, a case may occur in which power becomes insufficient in the power supply from the USB power-source and proper operation cannot be expected. Therefore, to be absolutely sure, the CD-R/RW drive unit 0 of this embodiment is constructed so as not to use a USB power-supply in principle.

The system controller 10 is provided with a ROM 26 and a RAM 27. In the ROM 26, for example, in addition to programs to be executed by the system controller 10, information required for the system controller 10 to perform various operation controls is prestored. In the RAM 27, various pieces of information obtained according to the various control processing performed by the system controller 10 are held.

1-2. Host Computer

Figure 2:
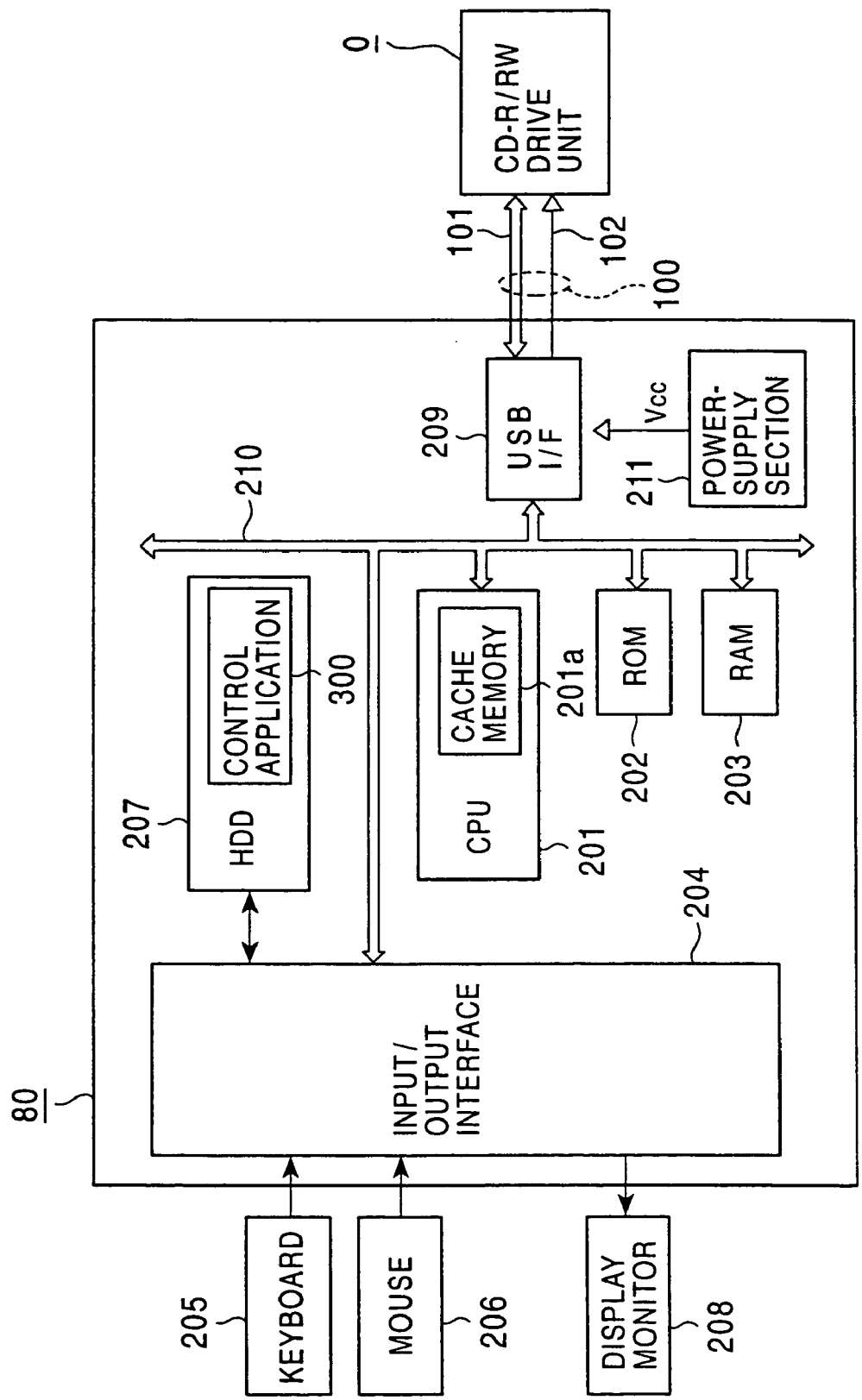
FIG. 2 is a block diagram showing an example of the internal construction of a host computer according to an embodiment of the present invention.

Next, the construction of the host computer 80 is shown in FIG. 2.

The host computer 80 of this embodiment is, for example, a personal computer apparatus, wherein application software for controlling a recording and playback operation of the CD-R/RW drive unit 0 is installed on this personal computer apparatus. This application program makes it possible to write data transferred from the host computer 80 side onto a disk loaded into the CD-R/RW drive unit 0, or to read data from a disk loaded into the CD-R/RW drive unit 0. In this embodiment, as will be described later, by performing communication with the CD-R/RW drive unit 0, the power-supply state, including the remaining battery level of the CD-R/RW drive unit 0 side, is recognized, and based on this power-supply state, processing related to various recording and playback, and control of various operations in the CD-R/RW drive unit 0, are performed.

From here on, the application software will also be referred to as "control application".

FIG. 2 shows the internal construction of the host computer 80.

The host computer 80 shown in this figure comprises a USB interface 209 as an interface for exchanging data externally. The USB interface 209 is connected to the USB bus 100, allowing mutual communication with an external device to be performed. In the case of this embodiment, the USB interface 209 is connected to the CD-R/RW drive unit 0.

The USB interface 209 converts the data received via a data bus 101 of the USB bus 100 according to a data format conforming to internal data communication, and outputs it to a CPU 201 via an internal bus 210.

Furthermore, the data output under the control of the CPU 201 is input, a modulation process in conformance with the USB format is performed thereon, and the data is transmitted and output externally via a USB bus 116.

Furthermore, in the USB interface 209, DC power can be supplied to a peripheral device which is connected via the USB bus 100 by using the power bus 102 as a transmission line. For this reason, the USB interface 209 is constructed in such a way that a DC power-supply voltage supplied from a power-supply section (to be described later) can be distributed and transmitted via the power bus 102.

The CPU 201 performs various processing according to programs held in, for example, a ROM 202. In this embodiment, in order for transmission and reception of various data in accordance with USB standards to be enabled, a program for controlling the USB interface 209 is also stored in the ROM 202. That is, in the host computer 80, a set (hardware and software) which is used for data transmission and reception by the USB interface is provided.

Also, the CPU 201 is provided with a cache memory 201*a*. For example, an actual cache memory is usually provided with a primary cache inside the CPU chip and a secondary cache which is provided externally. Here, these are collectively shown as one cache memory.

In a RAM 203, data, programs, etc., required for the CPU 201 to perform various processing, are held as appropriate.

A keyboard 205 and a mouse 206 are connected to an input/output interface 204, and the input/output interface 204 outputs an operation signal supplied from these devices to the CPU 201. In recent years, for example, a USB interface has been often employed as the interface for the keyboard 205 and the mouse 206, and such an interface of that operation system may be also employed in this embodiment.

Furthermore, a hard disk drive 207 having a hard disk as a recording medium is connected to the input/output interface 204. In the case of this embodiment, a control application 300, described above, is installed onto this hard disk drive 207, and the CPU 201 performs a control process according to the program of this control application 300, allowing various control for the CD-R/RW drive unit 0 to be performed.

The CPU 201 can record or read data, programs, etc., into or from the hard disk of the hard disk drive 207 via the input/output interface 204. In this case, a display monitor 208 for displaying an image is also connected to the input/output interface 204.

The internal bus 210 is formed of, for example, a PCI (Peripheral Component Interconnect) or a local bus, wherein internal function circuit sections are mutually connected with one another.

In a power-supply section 211, for example, a commercial AC power-supply is input to generate a DC power-supply voltage at a predetermined level, and this is output to each internal function circuit section. Also, if this host computer 80 is, for example, what is commonly called a notebook-type personal computer, the construction is formed in such a way that a DC power-supply voltage using a charger and an AC adapter as a power source can be supplied.

Although only USB is shown herein as the interface possessed by the host computer 80, for example, in practice, various interfaces, including the IEEE 1394 interface and an interface which goes through a PC card slot, may be employed.

2. Recording Method

A description will be given here of a recording method for the CD-R/RW drive unit 0 of this embodiment, and for a system in which the control application 300 is installed such recording method being made possible by the CD-R/RW drive unit 0.

In this embodiment, four recording methods of disk-at-once (DAO), track-at-once (TAO), session-at-once (SAO), and packet writing are possible.

The disk-at-once is a recording method in which writing is performed only once on one medium, that is, additional recording is prohibited.

Figure 3:
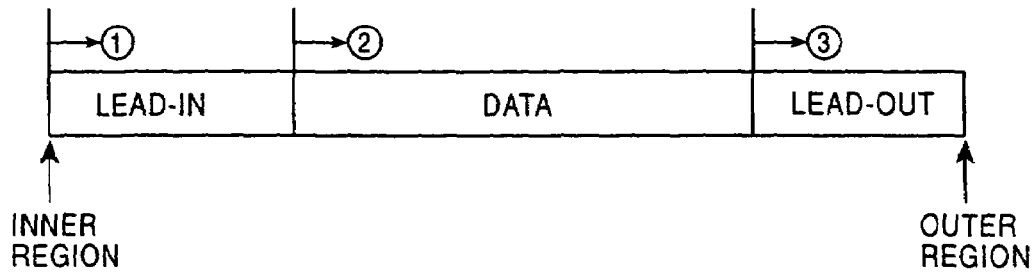
FIG. 3 is an illustration showing a disk-at-once (DAO) recording method.

In the CD format, it is prescribed that, for example, as shown in FIG. 3, recording is performed, in order, starting from the inner region side: (1) lead-in→(2) data→(3) lead-out. The lead-in indicates the data start position, and the lead-out indicates the data end position. In the disk-at-once, recording is performed in the order: lead-in→data→lead-out.

Figure 4:
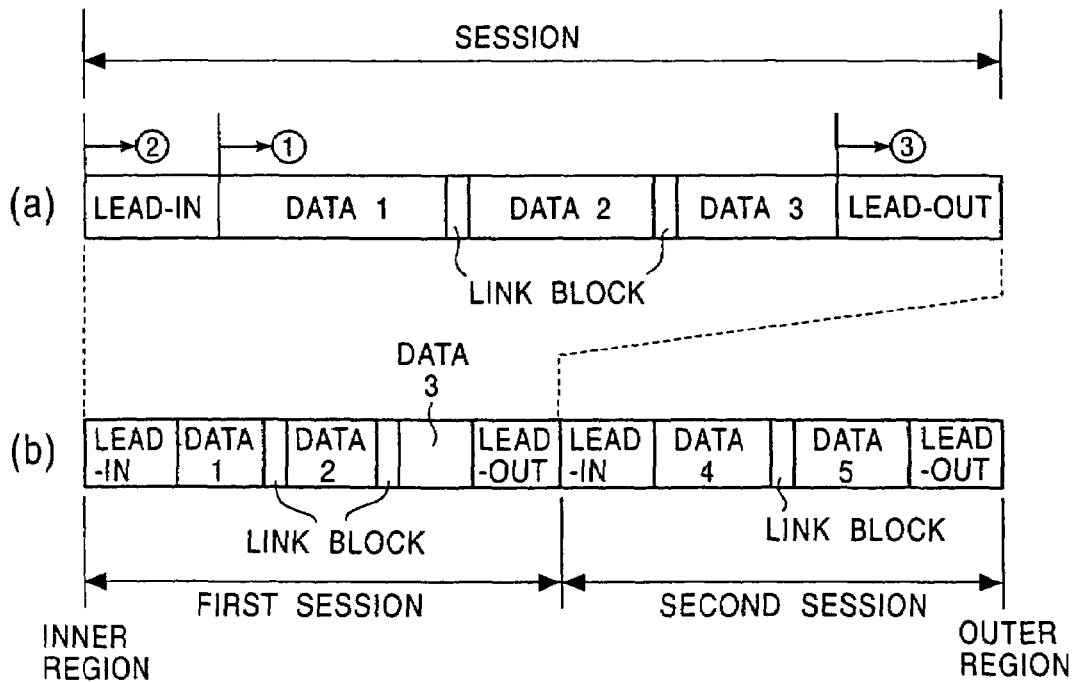
FIG. 4 is an illustration showing a track-at-once (TAO) recording method.

Unlike the above-described disk-at-once, in the track-at-once, as shown in part (a) of FIG. 4, recording is performed in the order: (1) data→(2) lead-in→(3) lead-out. However, for the area of the lead-in, in the stage before data is written, the area immediately before the data recording start position is allocated and, therefore, the order in which, for example, each area from the inner region to the outer region is arranged, is the same as that in the disk-at-once.

In track-at-once, an area formed of one [lead-in-data-lead-out] is called a "session", and the operation of writing the lead-in and the lead-out after the data is written is also called closing.

In the track-at-once, until the session is closed, it is possible to record additional data, for example, as shown as data 1, 2, and 3 in FIG. 4. However, as shown in part (a) of FIG. 4, a connection called a link block is formed between data.

Furthermore, in the track-at-once, even after the session is closed once, it is possible to perform a recording in such a manner that the next session is a newly recorded addition.

Assuming that the session in which, for example, data is recorded, as shown in part (a) of FIG. 4, is the first session, as shown in part (b) of FIG. 4, following this session, a second session can be recorded. However, further regarding this additionally recorded session, as shown in the figure, in a manner similar to that described in connection with part (a) of FIG. 4, recording is performed in the order: (1) data→(2) lead-in→(3) lead-out. That is, for each session, a lead-in and a lead-out are required.

Figure 5:
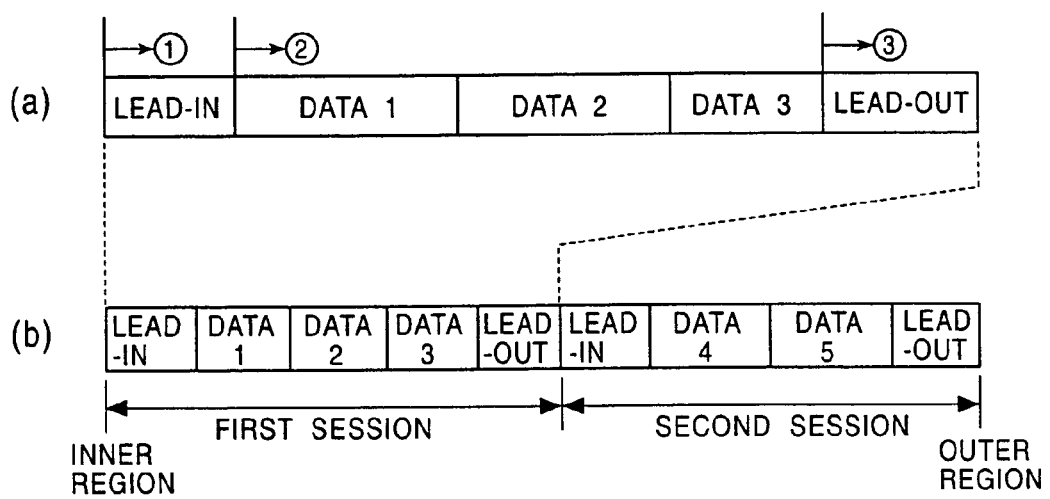
FIG. 5 is an illustration showing a session-at-once (SAO) recording method.

In the session-at-once, for one session, as shown in part (a) of FIG. 5, recording is performed in the order: (1) data→(2) lead-in→(3) lead-out. In this respect, the session-at-once is the same as the disk-at-once, and link blocks are not formed between tracks recorded within one session.

Also, in the session-at-once, as shown in part (b) of FIG. 5, a session can be additionally recorded.

Furthermore, in this embodiment, a recording method called packet writing is also possible.

For example, in the track-at-once, data is written in units of tracks (for example, in the case of audio data, data for one piece of music), whereas, in packet writing, writing is performed in units of packets obtained by, for example, subdividing the data of the track.

For example, this packet writing is suitable for a case in which writing is performed using data with file units, such as text, images, etc., handled by a personal computer, and it is desired to frequently update this written data.

3. Battery Information

Although the details will be described in portions which follow, in the system of this embodiment, when the CD-R/RW drive unit 0 is operating in a state in which it is driven by a battery (charger or dry battery), various power saving operations are performed according to the remaining battery level. Also, an operation for protecting data recorded on a medium is performed. These operations are possible as a result of the host computer 80 recognizing the remaining battery level of the CD-R/RW drive unit 0 in accordance with the program of the control application 300 and performing predetermined control on the CD-R/RW drive unit 0 on the basis of the recognized remaining battery level.

Therefore, for this purpose, it is required that a command set containing at least information about the remaining battery level be transmitted and received between the CD-R/RW drive unit 0 and the host computer 80.

Accordingly, in this embodiment, battery information is defined.

For example, in an interface, such as ATAPI, SCSI, IEEE 1394, or USB, employed in various data processing apparatuses, a command set conforming to the standard of MMC (Multimedia Command Set) is used. The battery information is defined as a vendor unique command which is unique to the vendor and which can be defined as desired, as this MMC command set.

As for a command transaction by the MMC, for example, a command for a request is transmitted from the apparatus side, as a controller, to the target side, and on the target side, a response command responding to this request is returned. The battery information is also transmitted in accordance with such a transaction rule. Therefore, a get battery information command for requesting the battery information is transmitted from the host computer 80, functioning as a controller, and the CD-R/RW drive unit 0, which is a target, returns a battery information page in response to this get battery information command.

FIG. 6 shows an example of the data structure of the get battery information command.

As shown in this figure, the get battery information command is composed of, for example, a 12-byte area ranging from the zeroth byte to the 11th byte.

First, in the zeroth byte, an operation code indicating the type of current command is placed. Herein, it is shown by, for example, D5h (h represents hexadecimal notation) as being battery information.

The next first byte is undefined.

The 6 low-order bits (bit 5 to bit 0) in the following second byte indicate a page code.

The battery information which can be requested by the get battery information command is permitted to make a plurality of pages (types) exist according to the content thereof, etc.

The page code specifies the above-mentioned page and, herein, a battery information page (to be described later) is indicated by, for example, a bit sequence of (000001).

The 2 high-order bits of the second byte, and the area from the third byte to the sixth byte are undefined.

The 2-byte area composed of the next 7th byte and the 8th byte is an allocation length. The allocation length limits the maximum data size of the battery information which is returned, as a response, from the target.

On the target side, a response within the range of the data size described in the allocation length is transmitted. On the controller side, a memory area for the data size indicated, for example, by the allocation length, is allocated. This prevents the memory from overflowing due to a response received on the controller side so as to become incapable of processing.

In this case, the remaining area from the 9th byte to the 11th byte is undefined.

Next, the structure of the battery information transmitted as a response from the target side in response to receiving the get battery information command, shown in FIG. 6 described above, is shown in FIGS. 7 to 10.

For example, this battery information is formed by 42 bytes, from the zeroth byte to the 41st byte, and FIGS. 7 to 10 show the contents of each of these areas in sequence.

As shown in FIG. 7, in the zeroth byte of the battery information, a page code is placed in the area of the 6 low-order bits (bit 5 to bit 0) following the undefined area of the 2 high-order bits, showing a value for specifying the page of the battery information. Therefore, in this case, in a manner similar to the page code of the get battery information command shown in FIG. 6, (000001) is stored. In the following first byte, a page length is shown to indicate the data size of the battery information. Herein, the page length=28h and, for example, this value is within a range of values indicated by the allocation length of the get battery information command.

In the second and subsequent bytes, contents concerning various power-supply states are shown.

The second byte is an area indicating the type of power-supply which is currently physically connected and can be used. Herein, bit 3 is assigned to the bus power supply by data bus connection by one of USB/IEEE 1394/PCMCIA, and bit 2 is assigned to a dry battery. Also, bit 1 is assigned to a charger, and bit 0 is assigned to an AC adapter. For example, if "1" is stored in the area for each bit, it is shown that the power-supply is physically connected and can be used, and if "0" is stored, it is shown that the power-supply is not physically connected and cannot be used.

The third byte is an area indicating the type of power supply which is currently used, and the manner in which each power-supply type is assigned to the bit position is the same as in the second byte. Setting of "1" as the value of the bit-indicates that the power-supply assigned to that bit position is currently in use.

The fourth byte is an area indicating the type of power supply which can be used in a case where a drive unit (in the case of this embodiment, the CD-R/RW drive unit 0), which is a target, reads data, as a computer peripheral device. The manner in which each power-supply type is assigned to the bit position is the same as in the second and third bytes. If "1" is stored in that bit position, this indicates that the power-supply can be used, and if a "0" is stored, this indicates that the power-supply cannot be used.

Also in each area of the fifth, sixth, and seventh bytes (to be described in the following), the manner in which each power-supply type is assigned to the bit position, and the significant contents indicated by the value at each bit position are the same.

The fifth byte is an area indicating the type of power supply which can be used in a case where the drive unit, as a computer peripheral device, writes data.

Figure 8:
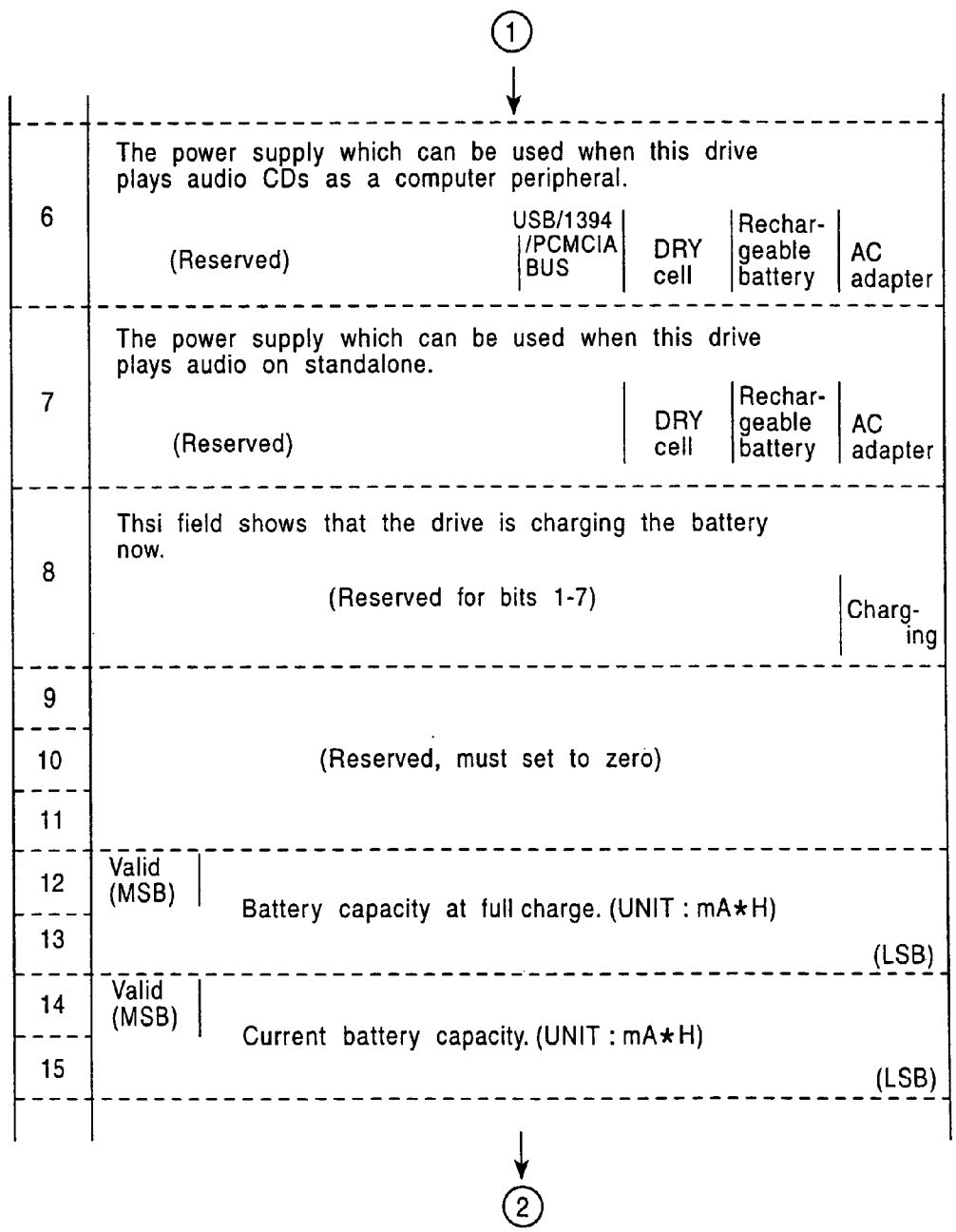

The area of the sixth byte to the 15th byte is shown in FIG. 8.

The sixth byte is an area indicating the type of power supply which can be used in a case where the drive unit plays back a CD-DA as a computer peripheral device.

The seventh byte is an area indicating the type of power supply which can be used in a case where the drive unit plays back a CD-DA by itself.

The eighth byte is an area indicating whether or not the charger is being currently charged. If "1" is stored in the bit position of bit 0, this indicates that the charger is being charged, and if "0" is stored, this indicates that the charger is not being charged.

The 3-byte area of the ninth byte to the eleventh byte is undefined.

In the total area of the 2 bytes of the twelfth and thirteenth bytes, the battery capacity when fully charged is shown.

Here, the 1-bit area of bit 7 of the twelfth byte, which is the MSB, is a validity bit area, and the area is a flag which indicates the validity/invalidity of the contents described in the 2-byte area of the twelfth and thirteenth bytes.

If it is "1", this indicates validity, and if it is "0", this indicates invalidity.

The 15 bits from bit 6 of the twelfth byte to bit 0 of the thirteenth byte indicate the battery capacity when fully charged. Herein, the value of the battery capacity is represented in units of mA×H.

Furthermore, a validity bit is also set in the start 1 bit in each area (to be described in the following), thereby indicating the validity/invalidity of the contents shown in each area.

In the 2-byte area of the fourteenth byte and the fifteenth byte, the current battery capacity, that is, the remaining battery level, is shown in units of mA×H.

The area of the sixteenth byte to the 29th byte is shown in FIG. 9.

In the 2-byte area of the sixteenth byte and the seventeenth byte, for example, the time required for the charged value to change from a zero remaining battery level to a fully charged level is shown in units of minutes. This value is known in advance by the specifications of, for example, the charger and the charging circuit of the power-supply section, and the value may be prestored, for example, in the ROM, etc., inside the drive unit. Then, this stored value may be used so as to be stored in this area.

In the 2-byte area of the eighteenth byte and the nineteenth byte, the time for which the operation can be continued in a case where data is to be read under predetermined conditions (the rotational speed of the disk, the luminance (switching on/switching off) of the LCD backlight of the display section, etc.) which are currently set in a state of being fully charged, is shown in units of minutes.

In the area of the 20th byte and the 21st byte, the time for which the operation can be continued in a case where data is to be written under predetermined operation conditions which are currently set in a fully charged state is shown in units of minutes.

If the disk rotational speed is high or if the LCD backlight is switched on at a high luminance, a larger amount of power is consumed and, therefore, the time for which the operation can be continued varies even at the same remaining battery level. Therefore, the time for which the operation can be continued is calculated by taking into consideration the operation conditions involving such variations of the power consumption. Here, the operation condition items regarding the time for which the operation can be continued is calculated are not particularly limited, and so in addition, the operation conditions such as those described below may be included.

For example, in the case of CD-Rs and CD-RWs, since the reflectance of light from the signal plane differs, the laser power to be radiated onto a signal plane also differs. Then, if the difference of the power consumption due to the difference in this laser power exerts a large influence on the time for which the operation can be continued, the time for which the operation can be continued may be determined by considering such operation conditions as one of the elements.

In the following area of the 22nd byte and the 23rd byte, the time for which the operation can be continued in a case where the playback of a CD-DA is output from a fully charged state is shown in units of minutes.

In the following area of the 24th and 25th bytes, the time for which the operation can be continued in a case where the reading of data is to be performed under predetermined operation conditions which are currently set at the current remaining battery level is shown in units of minutes.

In the area of the 26th and 27th bytes, the time for which the operation can be continued in a case where the writing of data is to be performed under predetermined operation conditions which are currently set at the current remaining battery level is shown in units of minutes.

In the area of the 28th and 29th bytes, the time for which the operation can be continued in a case where the playback of a CD-DA is to be output from a fully charged state is shown in units of minutes.

These times for which the operation can be continued, corresponding to the current remaining battery level and the operation conditions, can be viewed, to be brief, where the remaining battery level is replaced with the time for which the operation can be continued. For example, if it is assumed that the information of the current remaining battery level is available as the battery information, but the time for which the operation can be continued is not available, and when such a time for which the operation can be continued is necessary, the host computer 80 must calculate that time by using the remaining battery level and other parameters, causing an increase in the processing of the host computer 80. Therefore, if the time for which the operation can be continued is contained in the battery information as described above, it becomes possible for the host computer 80 to recognize the time for which the operation can be continued by directly referring to this value.

Also, since the time for which the operation can be continued can be obtained by taking into account various operation conditions which are currently set with respect to the remaining battery level, the time is information which has more accuracy than a case simply based on the remaining battery level.

When such information of time for which the operation can be continued is created in the CD-R/RW drive unit 0, a profile, such as, for example, the amount of power consumption for each of the various operation condition items, is prestored in the ROM 26. Then, when the battery information is generated, the system controller 10 reads the necessary parameter from the contents of the profile held in the ROM 26, and applies a predetermined function, for example, to this parameter and the current remaining battery level, thereby calculating each of the above-described remaining battery levels.

Figure 10:
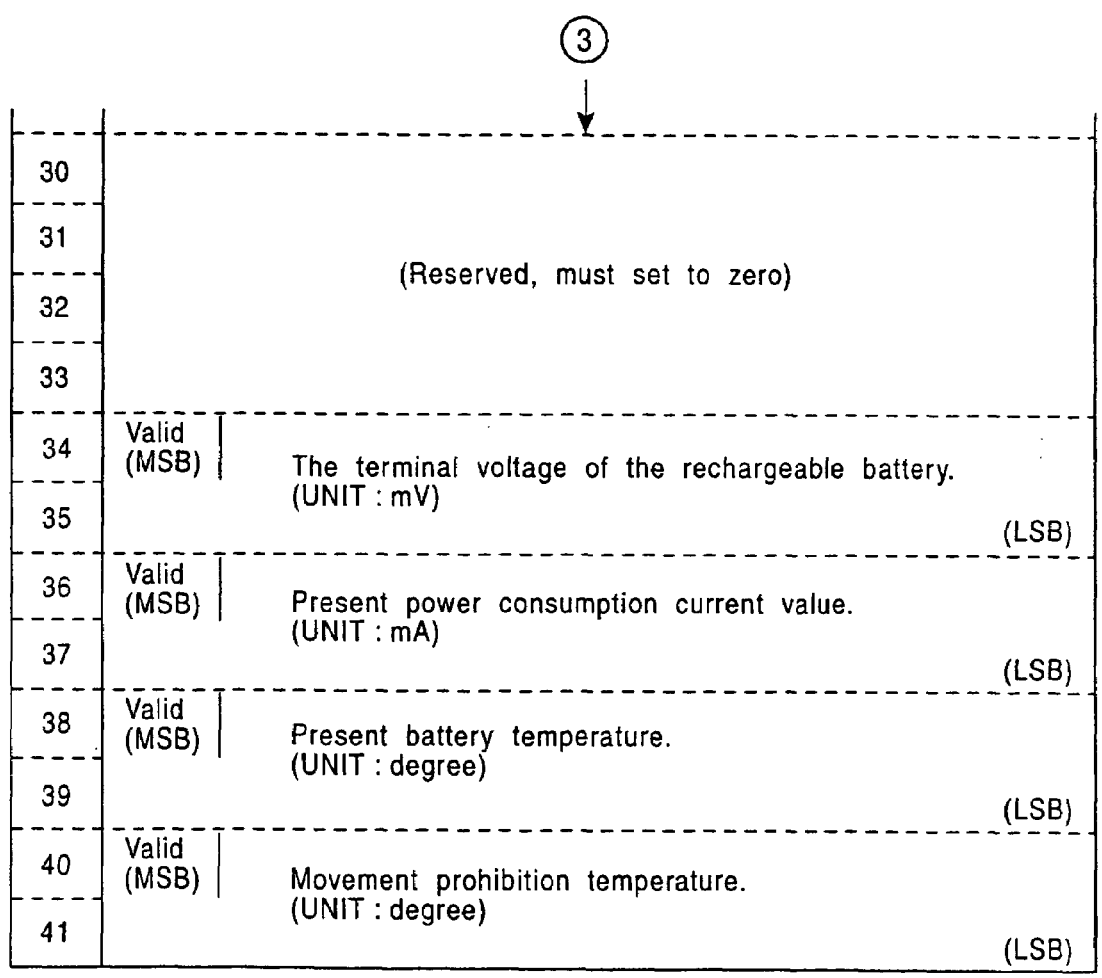

The area from the 30th byte to the 41st byte is shown in FIG. 10.

The area from the 30th byte to the 33rd byte is undefined at present.

In the 2-byte area of the 34th byte and the 35th byte, the current terminal voltage of the charger is shown in units of mV.

In the 2-byte area of the 36th byte and the 37th byte, the present current consumption value is shown in units of mA.

In the 2-byte area of the 38th byte and the 39th byte, the current temperature of the battery is shown. In order to obtain a value to be stored therein, for example, in the CD-R/RW drive unit 0 of this embodiment, a thermometer circuit for measuring the temperature of the battery (particularly a charger) is provided within the power-supply section 30.

Various uses of the information of the current battery temperature may be conceived. For example, the following is possible that, while the charger is being charged in the CD-R/RW drive unit 0, the host computer 80 side performs control so that if the temperature is high, the charging current is reduced, and if the temperature is low, a larger amount of charging current is allowed to flow.

In the 2-byte area of the 40th byte and the 41st byte, an operation prohibition temperature is shown.

Here, as was also described above, one high-order bit of each area of the 12th byte to the 41st byte is a validity bit. Only when this validity bit is "1", the information described therein is valid, and when "0", the information is invalid.

The reason why a validity bit is provided in the manner described above is due to, for example, the reasons such as those described below.

For example, when the drive unit starts a particular predetermined operation, a relatively large load variation appears. For example, at the disk rotation start time, etc., since the spindle motor is started to rotate, the load becomes heavy, and the terminal voltage of the charger is temporarily decreased.

In the manner described above, depending on the operating state of the drive unit, there are cases in which some of the states related to the power supply are not stable. For example, in a case where, based on the current power-supply state detected in this state, various information such as that described-above is created and it is stored in the battery information, these pieces of information are not reliable. Even if, for example, the host computer 80 performs control based on this information, this can lead to a malfunction.

Accordingly, in this embodiment, in the manner described above, in the case of a situation in which the value of the current information has a low reliability, "0" is set in the validity bit so that the information becomes invalid. As a result, a malfunction of the system is prevented from happening. This is realized by the system controller 10 monitoring the current operating status.

Also, in the battery information shown in FIGS. 7 to 10, a particular cluster of areas always starts from the even-numbered byte position (even-numbered address). The reason for this is that there are some personal computers, functioning as controllers, which cannot process data from an area with an odd-numbered address, and this is taken into consideration.

For example, in the system of this embodiment, it is assumed that the CD-R/RW drive unit 0 is connected as a peripheral device to the host computer 80, and that, in the host computer 80, the control application 300 is activated so that control for the CD-R/RW drive unit 0 is possible.

In this state, when it becomes necessary for the host computer 80 to recognize the power-supply state in the CD-R/RW drive unit 0, the battery information shown in FIG. 6 is transmitted to the CD-R/RW drive unit 0 via the USB bus 100. On the CD-R/RW drive unit 0 side, when the get battery information command is received, information corresponding to the current power-supply state is stored in each area of the structure shown in FIGS. 7 to 10, thereby creating the battery information. Then, this battery information is transmitted to the host computer 80.

In the host computer 80, by identifying the contents stored in the received battery information, it is possible to recognize the current power-supply state of the CD-R/RW drive unit 0. Then, as will be described from the following, the system operation is controlled according to the recognized power-supply state of the CD-R/RW drive unit 0. That is, the operation of the host computer 80 itself is controlled, and control for the CD-R/RW drive unit 0 is performed.

4. Operation During Data Recording and Playback

Figure 11:
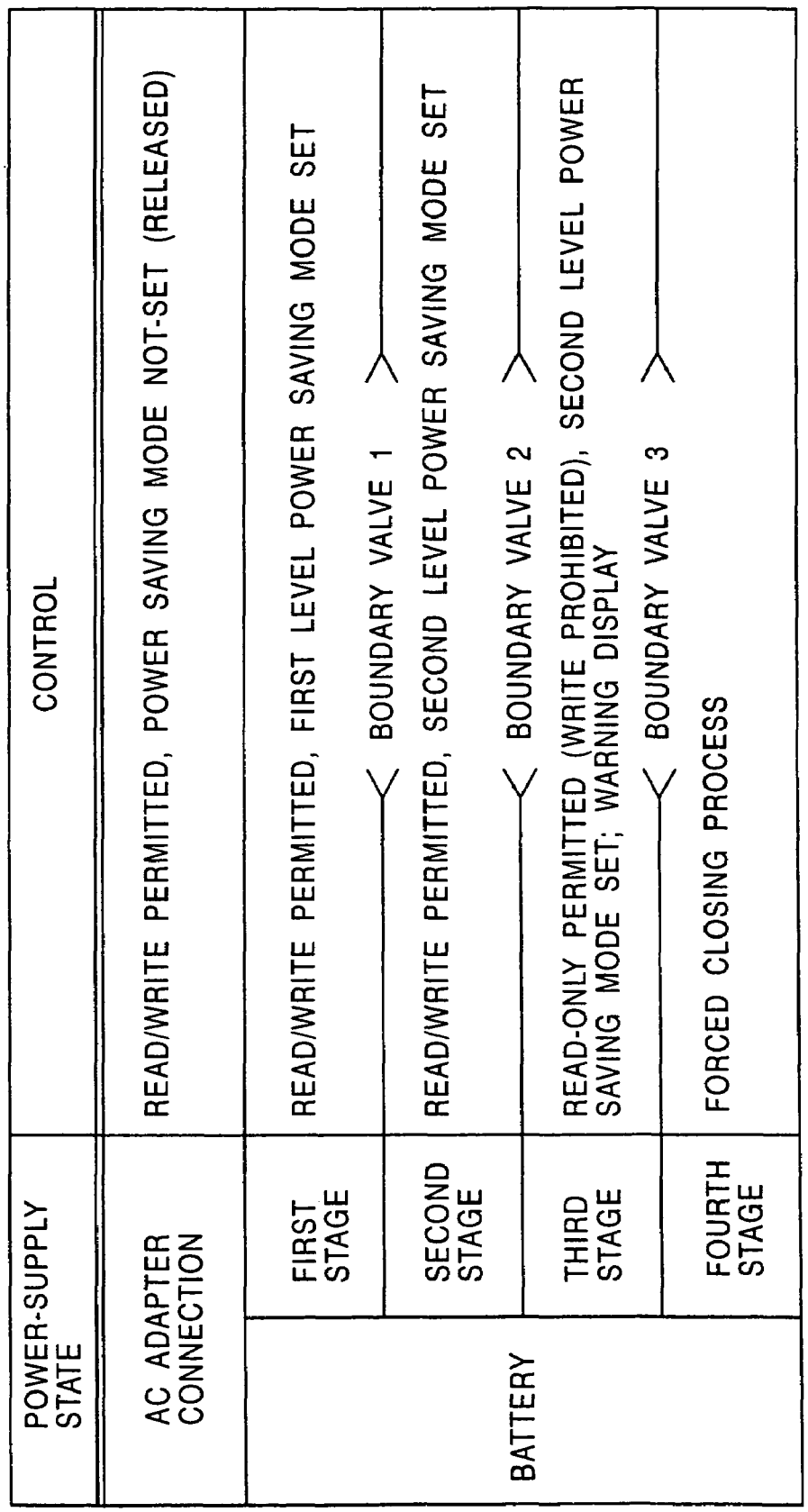
FIG. 11 is an illustration showing the correspondence between the power-supply state and system control operations in this embodiment.

FIG. 11 shows contents of control to be performed by the host computer 80 during a recording and playback according to the power-supply state of the CD-R/RW drive unit 0.

The power-supply state of the CD-R/RW drive unit 0 is classified into power supply by an AC adapter connection and power supply by a battery (a charger and a dry battery, respectively). As was also described above, this embodiment is formed in such a way that USB power is not used.

The power supply has a constant and stable performance when an AC adapter connection is used. Therefore, as shown in the figure, in this state, a read/write permission mode is set. That is, the host computer 80 sets a mode in which both the reading and writing of data onto and from a disk loaded into the CD-R/RW drive unit 0 are possible.

Furthermore, in this state, a power saving mode is not set. When a power saving mode is not set, the CD-R/RW drive unit 0 operates at the highest performance which is possible in the specification.

In this embodiment, the host computer 80 performs control so that the performance of the CD-R/RW drive unit 0 is forcedly decreased by a power saving mode (to be described later). The four operations which are controlled for this power saving are the disk rotational speed, the access speed, the electronic volume (variable amplifier 41) of the headphone output, and the luminance of the backlight of an LCD display.

For example, in the case of the first stage, concerning the disk rotational speed during a recording and playback, it is possible to set the highest disk rotational speed which is permitted in such a manner so as to correspond to the current operation mode and the medium. The "access speed" in this case refers to the rotational driving speed of the sled motor provided in the sled mechanism 8, and the rotational driving speed of this sled motor can also be rotated at the highest speed which is permitted in terms of the specification. Furthermore, the electronic volume can be adjusted up to the maximum level, for example, as a variable range. In addition, the backlight of the LCD display can also be switched on at the maximum brightness.

In comparison, in a state in which power is supplied by a battery, control is performed in the following manner by taking into consideration the fact that the remaining battery level will decrease as the use time elapses.

Here, in the case of the battery, the range of the time for which the operation can be continued, corresponding to the remaining battery level, is divided into first to fourth stages. Here, the boundaries between the first to fourth stages are determined by a boundary value 1, a boundary value 2, and a boundary value 3, which are predetermined.

The first stage is in the range of the boundary value 1 or more, including a fully charged state, in which a sufficient battery level remains. Therefore, the first stage is in a state in which the time for which the operation can be continued can also be sufficiently ensured.

The second stage is in a range of less than or equal to the boundary value 1, and is more than or equal to the boundary value 2. The second stage still has enough of a remaining battery level although it is smaller than in the first stage, and the time for which the operation can be continued, which is in a degree which does not pose a problem for a normal recording and playback, is ensured.

The third stage is in a range of less than or equal to the boundary value 2 and is more than or equal to the boundary value 3, and corresponds to a state in which the remaining battery level is decreased by such a degree that the time for which the operation can be continued, which is sufficient for normal use, cannot be ensured.

The fourth stage is at a level less than or equal to the boundary value 3, and is in a state in which the remaining battery level is decreased by such a degree that the time for which the operation can be continued, which is sufficient for the current data recording/playback to be completed, cannot be ensured.

In the state of the first stage, the host computer 80 sets the read/write permission mode. That is, both of an operation for reading the data, played back from the disk loaded into the CD-R/RW drive unit 0, into the host computer 80 side, and an operation for writing the data transferred from the host computer 80 into a disk, are possible.

Also, in the case of battery driving, a power saving mode in which the power consumption of the battery is reduced, is set. Also, in this power saving mode, the control level thereof is changed according to the stage, and in the first stage, the first level power saving mode is set.

In the first level power saving mode, overall performance is decreased so that the power consumption is less than the power consumption in the full performance state in which a power saving mode is not set.

In this embodiment, when the power saving mode is set to decrease the performance of the CD-R/RW drive unit 0, the operations such as those described below are performed in the CD-R/RW drive unit 0.

One is a decrease of the disk rotational speed. For example, if a change is made from a state in which the disk is rotated at 8× speed thus far to 4× speed, the rotational speed of the spindle motor 6 is decreased correspondingly, and the amount of power consumption is reduced.

Another is a decrease of the access speed.

The "access speed" referred to herein means the rotational speed of the motor called a "sled motor" which is a constituent of the sled mechanism 8. That is, if the rotational speed of the sled motor is decreased, the movement speed in the radial direction of the disk, of the optical pickup 1, is decreased, and the speed for a seek operation is decreased. Also in this case, the power consumption is reduced by an amount corresponding to the decreased rotational driving speed of the motor.

Furthermore, the sound volume which is set by an electronic volume of the variable amplifier 41 is limited up to a particular predetermined level. This makes it possible to reduce the power consumed by the variable amplifier 41.

Then, the luminance of the backlight of the display section 29, comprising an LCD, is decreased, or the backlight is switched off. Also, since the backlight of the LCD requires a relatively large amount of current, it is possible to effectively reduce the power consumption by controlling this backlight.

In the above-described first power saving mode, for example, in the case of the disk rotational speed, a rotational speed which is lower than the maximum rotational speed which is permitted when a power saving mode is not set, by one step, is assumed to be an upper-limit speed, and for the access speed (the rotational speed of the sled motor), similarly, a rotational speed which is lower, for example, by one step, is set. Also, for the level of the electronic volume, a predetermined level which is lower than the maximum level, by one step, is assumed to be an adjustable upper-limit level. Also, for the LCD backlight, a luminance which is darker than during full performance, by one step, is set. In the above-described manner, the performance may be decreased.

In the state of the second stage, setting of the read/write permission mode is the same as in the first stage, but, for a power saving mode, the second level power saving mode is set.

In the second level power saving mode, a level which is lower, in a stepwise manner, is set in the stage level of each performance, such as in the above-described disk rotational speed, access speed, limitation of the volume level, and luminance of the LCD backlight.

For example, concerning the disk rotational speed, if a 2× speed is set in the first stage, in the second stage, a 1× speed, which is lower than a 2× speed, is set. Furthermore, concerning the LCD backlight, if, for example, the luminance is decreased to approximately 50% in the first stage, in the second stage, the luminance is decreased to approximately 20% (or the LCD backlight is switched off at this stage). In this manner, in the second level power saving mode, the power consumption is further reduced more than in the first level power saving mode.

For example, in the first level power saving mode, the overall power consumption-need only be reduced more than in the power saving mode not-set, and in the second level power saving mode, the overall power consumption need only be reduced-more than-in the first-level power saving mode. Consequently, the combination of the level of each performance is as desired, with the result that, for example, performance which is common among the power saving mode not-set time, the first level power saving mode, and the second level power saving mode may be present.

More specifically, for example, concerning the LCD backlight, it is possible that the LCD backlight is switched on during the power saving mode not-set time, and that the LCD backlight is switched off in both the first level power saving mode and the second level power saving mode.

Furthermore, for example, concerning the disk rotational speed, it is possible that the highest speed is permitted during the power saving mode not-set time and in the first level power saving mode, and the speed is decreased only after the second level power saving mode is reached.

In addition to each of the above-described operation items (the disk rotational speed, access speed, volume, and LCD backlight), if there are operations such that a power saving effect is obtained by changing the level of the performance, these may be included as objects of control by the power saving mode.

In the third stage, a mode in which only reading is permitted, is set, that is, writing data onto a disk is prohibited.

For CD-Rs and CD-RWs, in the manner described above, a session must be closed by recording a lead-in and a lead-out finally when data recording is performed thereon, that is, by writing a file system onto a disk. For example, if the remaining battery level becomes zero in the middle of recording and the operation is stopped, a closing process cannot be performed under the control of the host computer 80. This leads to the destruction of the session in which data recording has been performed thus far or to the destruction of the disk medium itself.

Therefore, in this embodiment, as will be described next, in a case where the remaining battery level (the time for which the operation can be continued) becomes too low by the time the fourth stage is reached, the operation is rejected and the closing process is performed forcedly, so that before a proper recording can no longer be performed due to an insufficient remaining battery level, at least the data which has been recorded thus far will be protected.

The above-mentioned prohibition of writing is a procedure for the preparation for this purpose.

Also, in the third stage, the second level power saving mode which is set in the second stage is set similarly. On top of that, a warning display for the fact that the remaining battery level of the CD-R/RW drive unit 0 has become zero is produced, in a predetermined display form, on the operation screen (GUI (Graphical User Interface) screen)) of the control application displayed on the display monitor 208 of the host computer 80. In this embodiment, in the third stage or lower, power supplied by a battery is not recommended, and for the warning display, a connection of an AC adapter or a replacement of the battery (this includes a case in which, for example, from a state in which power supply is performed by a charger, a dry battery is loaded to change the power supply) is prompted to the user.

Then, in the fourth stage, for example, in the case of recording time, the above-described forced closing process is performed. Also, although not shown herein, for example, in the case of recording, a data reading operation is stopped at the time at which the reading of a particular track (data) is completed.

In the manner described above, in this embodiment, the performance of the device is changed and controlled for the sake of power saving according to the power-supply state, and an operation of, for example, data writing prohibition→warning display→closing process is to be obtained, thereby protecting the data recorded on the disk.

As power saving modes, two levels, that is, the first level power saving mode and the second level power saving mode, whose performance is less than the first level power saving mode, are provided according to the remaining battery level. That is, emphasis is placed on extending the battery life in such a way that, for example, while the remaining battery level is still acceptable, the user is not burdened by setting the performance state which is relatively satisfactory according to the first level power saving mode, and when the remaining battery level is not acceptable, a lower performance is set according to the first level power saving mode. That is, during the battery driving time, while achieving a power saving, operation with the most satisfactory performance possible is realized.

The number of steps of the remaining battery level and the number of steps of the power saving mode, shown in FIG. 11, may be subdivided.

Figure 12:
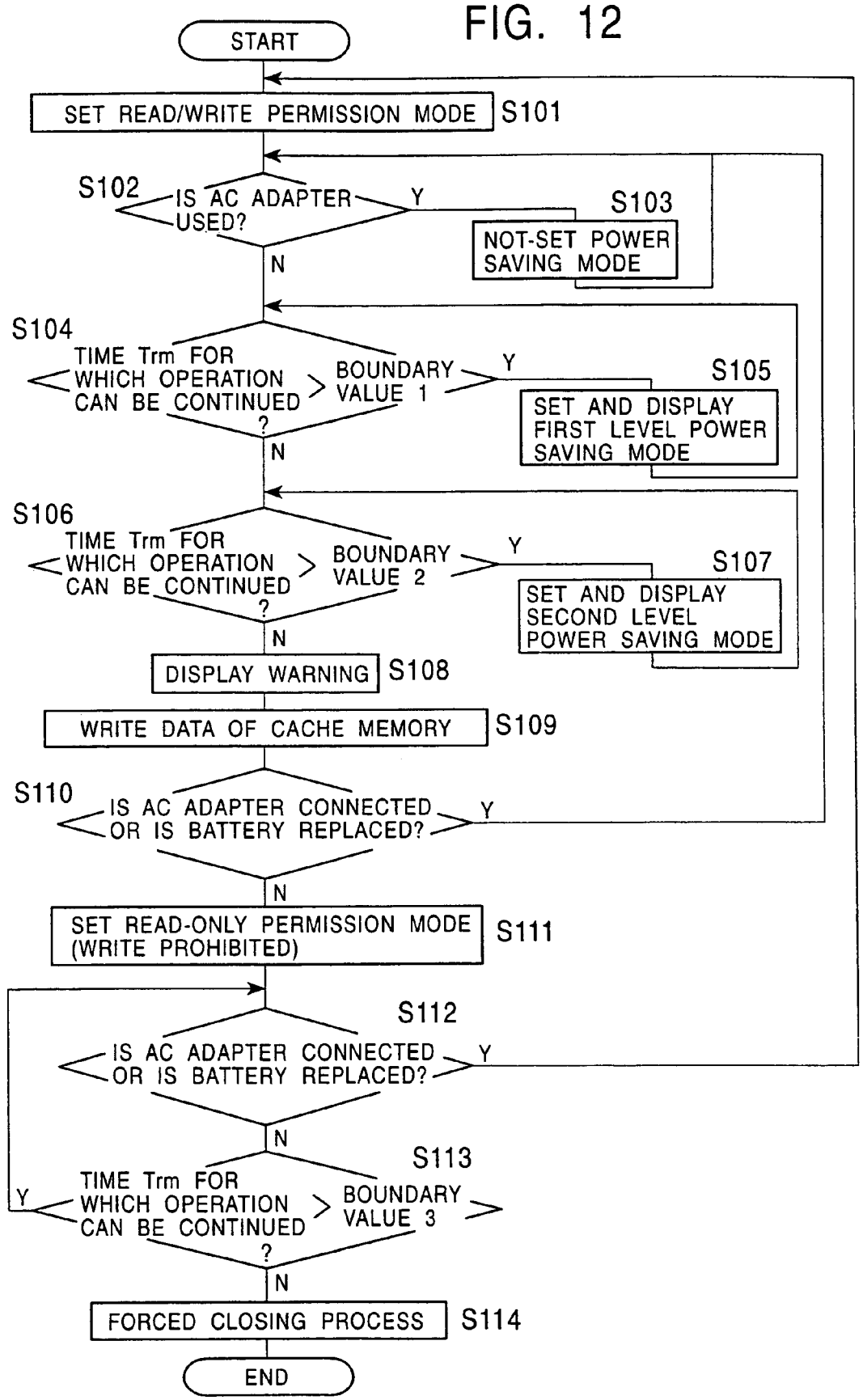
FIG. 12 is a flowchart showing a processing operation for realizing a system control operation according to the power-supply state shown in FIG. 11.

FIG. 12 shows a processing operation for realizing the control of the host computer 80 according to the power-supply state of the CD-R/RW drive unit 0, shown in FIG. 11.

FIG. 12 is also a flowchart showing a processing operation when the host computer 80 recognizes the CD-R/RW drive unit 0 as a peripheral device when this process is performed and performs a recording and playback. Here, this is mainly a process for controlling the CD-R/RW drive unit 0 so that, when the CD-R/RW drive unit 0 is performing a recording or playback, a power saving operation is obtained according to the power-supply state of the CD-R/RW drive unit 0.

This process is performed by the CPU 201 of the host computer 80 in accordance with the program of the control application 300. Also, when the process shown in this figure is performed, the host computer 80 has recognized the CD-R/RW drive unit 0 as a peripheral device. Although not shown in this figure, as a program of the control application 300, a get battery information command is transmitted at intervals of a predetermined time period, and battery information which is returned as a response is received, thereby continuously monitoring the power-supply state of the CD-R/RW drive unit 0 side.

In the process shown in this figure, for example, in step S101, a read/write permission mode is set, and the process proceeds to subsequent processes.

After step S101, for example, in step S102, it is determined whether or not the type of power supply which is currently used is an AC adapter. This can be determined by the contents of the third byte (FIG. 7) of the battery information.

When a "YES" result is obtained in step S102, it is determined that the power is currently supplied by an AC adapter. Thus, in this case, the process proceeds to step S103, whereby the power saving mode is not set, and the process returns to step S102.

In contrast, when a "NO" result is obtained in step S102, it is determined that a battery (a charger or a dry battery) is currently used as a power supply. In this case, the process proceeds to step S104.

In step S104, a comparison between the time Trm for which the operation can be continued, and the boundary value 1, at the current remaining battery level, is performed, so that a determination is made as to whether or not the relation expressed by Trm>boundary value 1 has been obtained.

The time Trm for which the operation can be continued at the current remaining battery level can be recognized by referring to one of the 2-byte areas (FIG. 9) of [24th byte–25th byte], [26th byte–27th byte], and [28th byte–29th byte], according to which one of read/write/audio data read the current operation is.

When a Yes result is obtained in step S104, the process proceeds to step S105, and the power-supply state at this time corresponds to the first stage described in connection with FIG. 11. Therefore, in this case, the first level power saving mode is to be set. For this purpose, the CPU 201 of the host computer 80 transmits a command such that the operation for the first level power saving mode is performed by the CD-R/RW drive unit 0. On the CD-R/RW drive unit 0 side, the internal operation is controlled in response to the received command, causing the operation for the first level power saving mode to be performed.

As a result of the process of, for example, step S105, here, a display showing that the first level power saving mode is set is produced on the display monitor 208 of the host computer 80. Alternatively, in a continual manner, for example, for the power-supply state of the CD-R/RW drive unit 0, the type of power supply which is currently used and the remaining battery level, may be displayed, and in addition, if in the middle of charging, the fact that charging is being performed may be displayed, and also, the charging progress status may be displayed.

Here, referring to the flowchart in FIG. 16, a description is given of an example of a processing operation for setting an operation for the first level power saving mode, which is the process of step S105, in the CD-R/RW drive unit 0.

Here, initially, in step S501, an instruction for changing the disk rotational speed, for a recording or playback, to a predetermined speed, is issued to the CD-R/RW drive unit 0. For this purpose, for example, a request command, which specifies a predetermined disk rotational speed, which is lower than the disk rotational speed which has been set thus far, is transmitted to the CD-R/RW drive unit 0. In response to this command, the system controller 10 of the CD-R/RW drive unit 0 decreases the disk rotational speed during recording or playback. For example, the value of the reference speed in the PLL circuit, which is inside the encoding/decoding section 12, is changed and set and in the case of, in particular, during recording, a clock frequency corresponding to this disk rotational speed is set. As a result, it becomes possible to properly record data onto a disk at a transfer rate corresponding to the reduced disk rotational speed.

Here, in a case where, for example, the disk rotational speed in the CD-R/RW drive unit 0 is decreased, for example, during recording, the data writing speed onto a disk on the CD-R/RW drive unit 0 side, is also decreased correspondingly. Therefore, in this case, the recording data transferred from the host computer 80 is also needed to correspond with the disk rotational speed. Accordingly, in the subsequent step S502, a data transfer rate corresponding to the disk rotational speed which is changed and set in step S501, is set. Thereafter, data is sent out from the USB interface 13 at a data transfer rate which was set in step S502.

In the following step S503, a command for instructing a decrease in the access speed, that is, a decrease in the rotational speed of the sled motor, is transmitted and output to the CD-R/RW drive unit 0. In the system controller 10 of the CD-R/RW drive unit 0, the driving current of the sled motor-in the sled mechanism 8 is controlled so that the rotational speed of the sled motor specified by this received command is reached.

Then, in the following step S504, a command for instructing that the luminance of the LCD backlight of the display section 29 be decreased to a predetermined level is transmitted. Furthermore, when the LCD backlight should be switched off, it is also possible for this command to instruct the switching off. In the CD-R/RW drive unit 0, control is performed on the display section 29 so that the luminance of the LCD backlight, specified by the received command, is obtained.

Then, when the processing up to step S504 is terminated, a status display for informing the user of the fact that, for example, the first level power saving mode is currently set, is produced, in a predetermined display form, for example, on the display screen displayed on the display monitor by the control application. For example, by viewing this display, it is possible for the user to confirm that the reduced performance, for example, on the CD-R/RW drive unit 0 side is caused by entering the power saving mode.

As described above, according to the processing shown in FIG. 16, a command for specifying an individual performance is transmitted from the host computer 80 to the CD-R/RW drive unit 0, and on the CD-R/RW drive unit 0 side, internal control is performed so that the performance specified by the received command is obtained. As a result, for the CD-R/RW drive unit 0, an operation for the power saving mode is obtained.

When the power saving mode is set, for example, a command for instructing the CD-R/RW drive unit 0 to perform a power saving mode operation may be defined, and this command may be transmitted. In this case, as the command contents, the level of the power saving mode is specified. On the other hand, in the CD-R/RW drive unit 0, as a program, control for decreasing, in a batch processing manner, the disk rotational speed, the access speed, the LCD backlight, etc., according to the power saving level specified by the command of the power saving mode request, is performed.

The description now returns to FIG. 12.

When a "NO" result has been obtained in step S104, the process proceeds to step S106. A case in which a "NO" result is obtained in step S104 is a case in which a stage lower than the first stage shown in FIG. 11 is reached.

In step S106, a comparison between the time Trm for which the operation can be continued, and the boundary value 2, is performed to determine whether or not the relation expressed by, Trm>the boundary value 2, holds true.

When a "YES" result has been obtained in step S106, it is assumed that the power-supply state is in the second stage shown in FIG. 11. So, in this-case, the process proceeds to step S107, whereby the second level power saving mode is set.

The actual process shown in step S107 may be similar to the flow of the processing operation as described above in connection with FIG. 15. However, in the process of step S107, for example, a level lower than in the case of the process of step S105, is set into the level of the performance of a predetermined operation from among each operation, such as the disk rotational speed, access speed, limitation of the volume level, and decrease in the luminance (switching-off) of the LCD backlight.

In contrast, when a "NO" result has been obtained in step S106 and the remaining battery level is at a level lower than that of the second stage, the process proceeds to the process of step S108.

As was also described above in connection with FIG. 11, in the third stage, it is not recommended that the CD-R/RW drive unit 0 be operated by the battery, and a warning display is output.

So, in step S108, a display control process is performed so that a warning display which informs the fact that the remaining battery level has become low is produced on the operation screen by a control application, displayed on the display monitor 208. In this case, as for the warning contents, the user is also prompted for a connection of an AC adapter or a replacement of the battery.

The process of the subsequent step S109 is a process performed when recording data is transferred from the host computer 80 and the data recording is being performed by the CD-R/RW drive unit 0, and the process is not performed in a state in which an operation for reading (playing back) data is being performed, in the processing progress shown in this figure.

In the step S109, the recording data held in the cache memory 201a, possessed by the CPU 201, is written and is transferred to the CD-R/RW drive unit 0. As an example, if recording of data has been performed by packet writing, this process reads all the data to be written onto the disk by packet writing from the cache memory and transfers it to the CD-R/RW drive unit 0. In the CD-R/RW drive unit 0, this transferred data is recorded on the disk, thereby completing the recording of the data for one packet (for one file) onto the disk.

Then, in the following step S110, it is determined whether or not the AC adapter has been connected or the battery has been replaced. For this determination process, for example, the type of power supply which is currently in use, described in the third byte (FIG. 7) of the battery information, or the current remaining battery level in the [14th byte–15th byte] of the battery information, is referred to.

For example, if the AC adapter is connected, the fact that the AC adapter is the power supply which is currently in use is described in the third byte of the battery information, and if the battery is replaced, the value of the remaining battery level of the [14th byte–15th byte] of the battery information is changed to a larger value.

When a "YES" result has been obtained in the above step S110, the process returns to step S102. As a result, the transfer of the recording data from the host computer 80 to the CD-R/RW drive unit 0, which is prohibited as a result of the process of the above step S109, is permitted. Furthermore, the power saving mode which has been set thus far is released.

In contrast, when a "NO" result has been obtained in step S110, the process proceeds to step S111. In step S111, the permission mode is set to a mode in which recording (writing) of data onto a disk is prohibited, and only reading of data is permitted. As a result, from here on, the writing of data from the host computer 80 onto the CD-R/RW drive unit 0 is prohibited, and this state is continued, for example, until the AC adapter is connected and the power saving mode is released, or until the battery is replaced and thereby a state is reached in which the condition expressed by the time Trm for which the operation can be continued>the boundary value 2 is satisfied.

Then, in the following step S112, it is determined again whether or not the AC adapter has been connected or the battery has been replaced.

For example, here, if neither the connection of the AC adapter, nor the replacement of the battery is performed, and when a "NO" result is obtained in the above step S112, the process proceeds to step S113, whereby a comparison between the time Trm for which the operation can be continued and the boundary value 3 is performed, also here, to determine whether or not the relation of time Trm for which the operation can be continued>the boundary value 3 is satisfied.

Then, as long as the third stage is maintained as the power-supply state and a "NO" result has been obtained in step S113, the process returns to step S112. That is, in the third stage, all the recording data of the cache memory 201a is transferred to the CD-R/RW drive unit 0, and waiting for the connection of the AC adapter or the replacement of the battery to be performed, is done in a state in which subsequent writing is prohibited.

Then, when the connection of the AC adapter or the replacement of the battery is performed under this state, and when a "YES" result is obtained in step S112, the process returns to step S101.

Furthermore, if the remaining battery level is decreased by such a degree that the power-supply state reaches the fourth stage shown in FIG. 11, under the state in which the state of the third stage continues in the manner described above, a "NO" result is obtained in step S113, and the process returns to step S114.

Step S114 is a process corresponding to recording, and as described in FIG. 11, a forced closing process is performed. For this purpose, the CPU 201 of the host computer 80 creates a file system of the data which has been written onto the disk as a session for this time, and performs a closing process so that this file system is recorded. That is, in order for an area of one session formed by lead-in-data-lead-out to be finally recorded onto a disk, necessary data (file system, etc.) is transferred to the CD-R/RW drive unit 0, and recording onto the disk is performed.

If data recording has been performed instead of, for example, the process of the above step S114, the playback may be terminated when the reading of the data of, for example, a particular file (or track) by the host computer 80 is completed.

5. Operation for Each Recording Mode

The outline of processing in a case in which a recording and playback is performed by the CD-R/RW drive unit 0 in accordance with the cooperation of the host computer 80 and the system comprising the CD-R/RW drive unit 0 is shown in FIGS. 11 and 12.

However, as recording methods, as described above, there are four recording methods: disk-at-once (DAO), track-at-once (TAO), session-at-once (SAO), and packet writing.

Therefore, as the recording modes, there are four modes: the DAO mode, the TAO mode, the SAO mode, and the packet writing mode. The time when an operation in accordance with the process shown in FIG. 12 is actually performed is only the packet writing mode time, and in the DAO, TAO, and SAO modes, operations are somewhat different.

This is due to the following reasons that, for example, in the packet writing, additional recording is possible with units of data of a relatively small size as packets, whereas, for example, in the DAO and SAO modes, the session is closed when one time of data writing of lead-in→data→lead-out is continuously performed and, therefore, the disk rotational speed (recording speed) cannot be changed in the middle of recording. Furthermore, in the TAO mode, as long as the session is not closed, additional writing can be performed on the disk in units of tracks. However, since the tracks usually have a relatively large data size, and the disk rotational speed (recording speed) cannot be changed in the middle of recording this track, and also for this reason, a control operation differing from that during packet writing is necessary.

Therefore, from here on, a description is given of a control operation of the host computer 80 on the basis of the power-supply state, corresponding to each actual recording mode, of the CD-R/RW drive unit 0.

Figure 13:
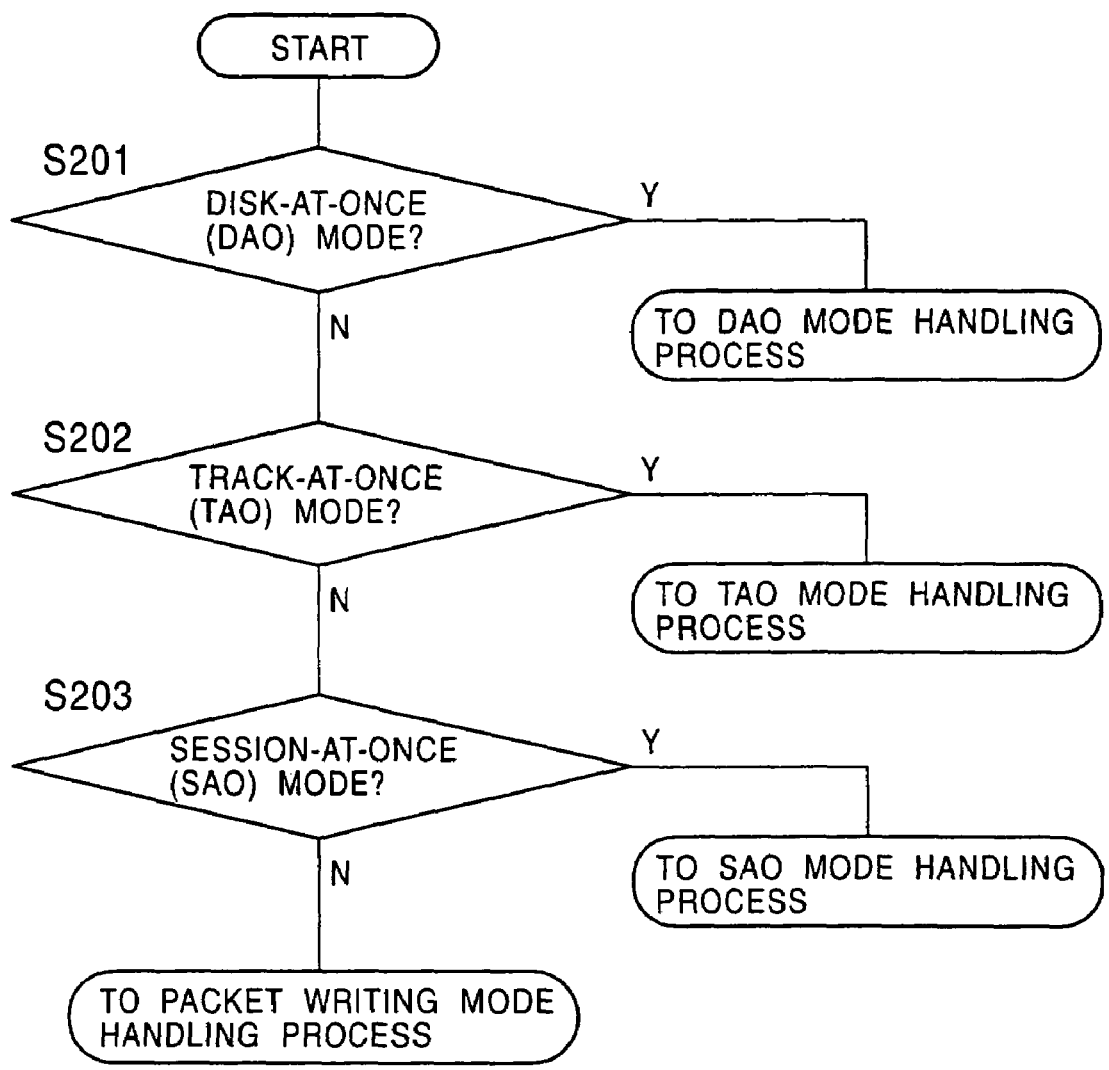
FIG. 13 is a flowchart showing a process for determining a recording mode as a processing operation for realizing a system control operation corresponding to each recording mode.
Figure 14:
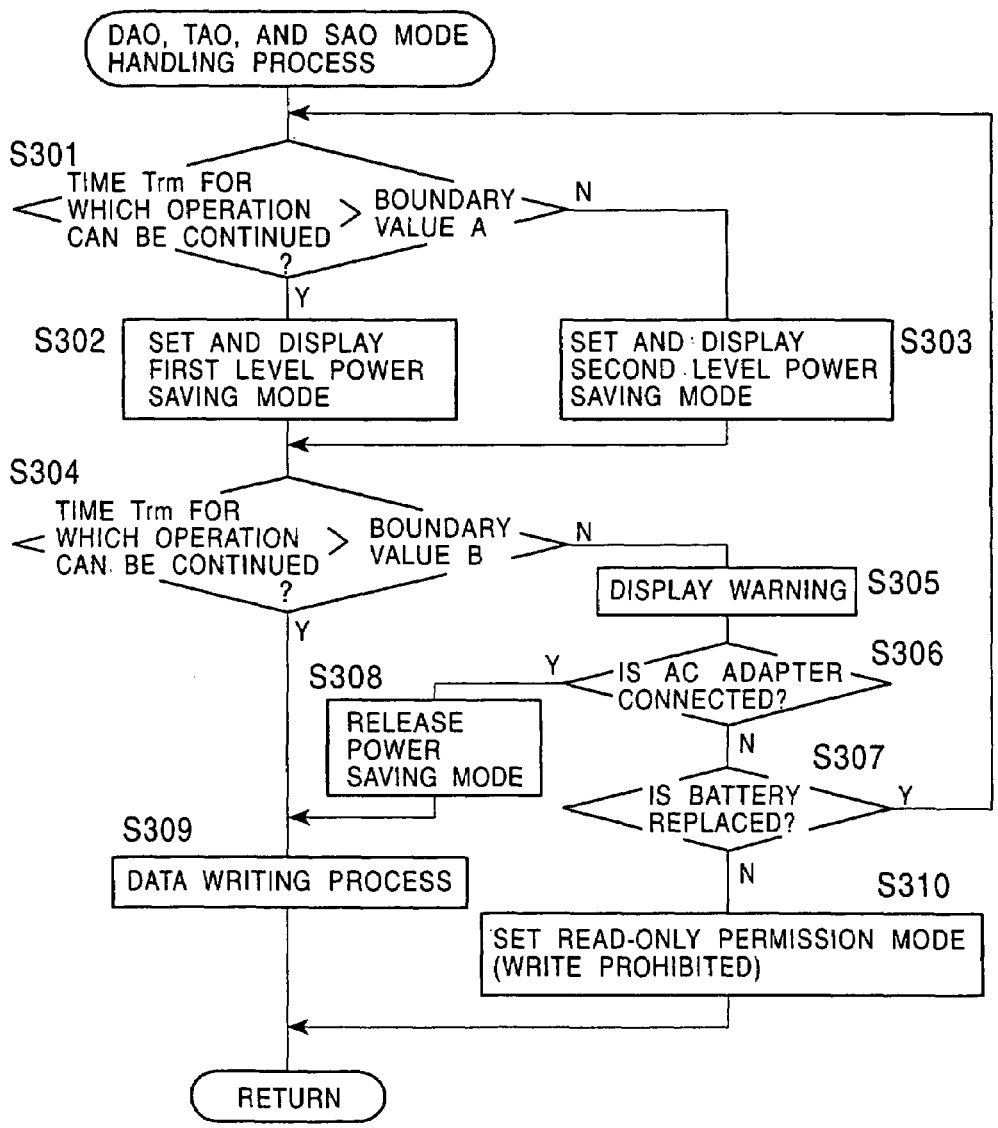
FIG. 14 is a flowchart showing a processing operation for realizing a system control operation corresponding to DAO, TAO, and SAO as a recording mode.
Figure 15:
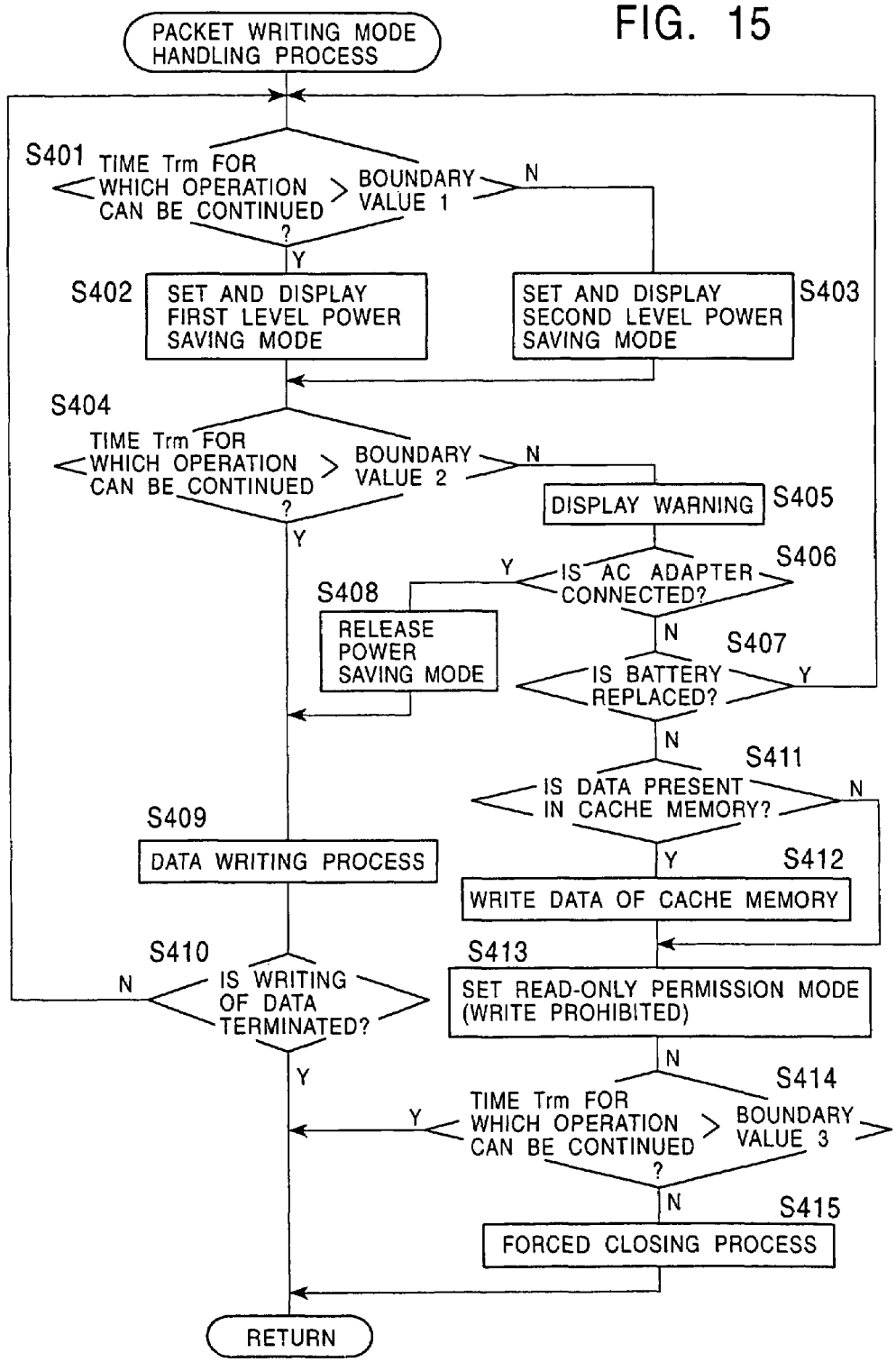
FIG. 15 is a flowchart showing a processing operation for realizing a system control operation corresponding to packet writing as a recording mode.

For this description, the flowcharts in FIGS. 13 to 15 will be referred to. It is assumed that the process shown in these figures is also performed by the CPU 201 in accordance with the program as the control application 300. It is also assumed that the process shown in these figures is started from the state in which the CD-R/RW drive unit uses a battery as a power source.

Initially, during recording, in order for the host computer 80 to perform control corresponding to the power-supply state (remaining battery level) of the CD-R/RW drive unit 0, a determination is made as to the current recording method in accordance with the process of FIG. 13. This process may be performed at a predetermined time corresponding to, for example, the recording start time.

Here, initially, in step S201, it is determined whether or not the current recording mode is the DAO mode. If it is determined that the current recording mode is the DAO mode, the process proceeds to a DAO mode handling process.

When it is determined that the current recording mode is not the DAO mode and a "NO" result has been obtained in step S201, the process proceeds to the following step S202, whereby it is determined whether or not the recording mode is the TAO mode. When a "YES" result is obtained in this step, the process proceeds to a TAO mode handling process. If a "NO" result has been obtained, the process proceeds to step S203.

In step S203, it is determined whether or not the recording mode is the SAO mode. If a "YES" result is obtained, the process proceeds to a SAO mode handling process. When a "NO" result has been obtained, the recording mode is assumed to be the remaining packet writing mode, and the process proceeds to a packet writing mode handling process.

FIG. 14 shows control operations for the DAO mode handling process, the TAO mode handling process, and the SAO mode handling process.

In each of the DAO, TAO, and SAO recording modes, for example, in the manner described in connection with FIGS. 3, 4, and 5, since a recording by a respectively different method is performed, the control for data writing differs, but the control operation corresponding to the power-supply state is substantially the same. Accordingly, for the convenience of descriptions, one process is shown.

Here, initially, in step S301, the comparison between the time Trm for which the operation can be continued corresponding to the current remaining battery level and the performance status, and the boundary value A is performed to determine whether or not the state of Trm>boundary value A is reached. Here, the boundary value A corresponds to the boundary value 1 shown in, for example, FIG. 11.

When a "YES" result has been obtained in step S301, the process proceeds to step S302, whereby the first level power saving mode described in connection with, for example, FIG. 11 is set, and a mode set status is displayed on the display monitor 208. The process for the power saving mode setting herein is the same as the process of step S105 of, for example, FIG. 12.

In contrast, when a "NO" result has been obtained, the process proceeds to step S303, whereby the second level power saving mode is set, and this mode set status is displayed for output.

Then, after the processing of these steps S302 and S303 is terminated, the process proceeds to step S304.

In step S304, a comparison between the time Trm for which the operation can be continued and the boundary value B is performed to determine whether or not the state of Trm>the boundary value B is reached. The boundary value B is assumed to be a value lower than the boundary value A, that is, correspond to a remaining battery level which is lower than the boundary value A. Furthermore, in the case of during the DAO mode or during the SAO mode, a value corresponding to a time period required to record one session to be recorded from now on is set. Also, in the case of during the TAO mode, a value corresponding to a time period required to record one track to be recorded from now on is set. This is computed by the CPU 201 by using, for example, the recording speed (disk rotational speed) which is set as the current performance and the data size for one session or for one track. However, if a high degree of accuracy is not necessary, an average value may be held in advance.

Here, if a "YES" result has been obtained in step S304, depending on the current remaining battery level, since it is possible to write data for one session or for one track, the process proceeds to step S309, whereby a data writing process is started. After the data writing process has started once in step S309, data for one disk (in the case of the DAO mode), for one session (in the case of the SAO mode), and for one track (in the case of the TAO mode) will be written, for example, at the disk rotational speed (recording speed) corresponding to the current power saving mode state.

In contrast, when a "NO" result has been obtained in step S304, that is, when it is determined depending on the current remaining battery level that it is not possible to write data for one session or for one track, the process proceeds to step S305, whereby a warning display is produced. That is, the fact that the remaining battery level becomes insufficient is issued, and in this case, a message for prompting a connection of an AC adapter or a replacement of a battery is displayed.

Then, in the following steps S306 and S307, waiting for the connection of an AC adapter or the replacement of a battery is performed.

Here, in step S306, a determination is made as to whether or not an AC adapter has been connected. When a "YES" result is obtained, first, the process proceeds to step S308, whereby if a power saving mode has been set according to the processing thus far, this power saving mode is released, after which the process proceeds to step S309, whereby a data writing process is started. When, in contrast, a "NO" result is obtained, the process proceeds to step S307, whereby a determination is made as to whether or not the replacement of a battery has been performed.

When it is determined in step S307 that the replacement of the battery has been-performed and a "YES" result is obtained, the process returns to step S301. In contrast, when a "NO" result has been obtained, the process proceeds to step S310.

In step S310, a mode in which only reading is permitted is set, and writing is prohibited. This process prevents writing of data onto the disk of the CD-R/RW drive unit 0 from being started in a case where neither the connection of the AC adapter, nor the replacement of the battery has been performed in a state in which the remaining battery level is low, and the closing of recording of the data for one session or for one track cannot be ensured. As a result of the starting of data writing being prohibited in this manner, in the case of the DAO mode, the recording of data for one disk is not started and is cancelled. In the case of the TAO and SAO modes, the recording of data for one track and for one session is not started, respectively, and is cancelled.

FIG. 15 shows a control operation for a packet writing mode handling process. As was also described above, the packet writing mode handling process is also shown by a control process during a recording and playback shown in FIG. 12 above. Here, the description will be described in a little detail by being limited to only the packet writing mode handling process.

Here, initially, in step S401, for the time Trm for which the operation can be continued, corresponding to the current operating status and the remaining battery level, and the boundary value 1 (see FIG. 11), it is determined whether or not Trm>the boundary value 1 holds true. If a "YES" result is obtained in this step, the current power-supply state is assumed to be at the remaining battery level in the first stage (see FIG. 11) during battery driving, and therefore, the process proceeds to step S402, whereby the first level power saving mode is set and this power saving mode is displayed.

In contrast, when a "NO" result has been obtained in step S403, since the power-supply state is assumed to be at a stage equal to or lower than the second stage during battery driving, the process proceeds to step S403, whereby the second level power saving mode is set and this power saving mode is displayed.

After the processing of these steps S402 and S403 is performed, the process proceeds to step S404.

In step S404, regarding the time Trm for which the operation can be continued and the boundary value 2, it is determined whether or not Trm>the boundary value 2 holds true.

When a "YES" result is obtained in this step, the power-supply state is assumed to be at the first stage or at the second stage during battery driving.

In this case, the process proceeds to step S409, whereby a data writing process is started. The data writing process in this case is a process for writing data for one packet on a disk. Then, in the following step S410, recording data is transferred from the cache memory 201a of the host computer 80 to the CD-R/RW drive unit 0 side, and waiting for the writing of this transferred data on the disk to be terminated is performed.

When it is determined in step S410 above that the data writing has not yet been terminated, the process returns to step S401, whereby a comparison between the time Trm for which the operation can be continued in the middle of this data recording process and the boundary value 1, 2, or 3 is performed, and a control process corresponding to this comparison result is performed.

Then, if the data writing has been terminated in a state in which, for example, the second stage (FIG. 11) is maintained as the remaining battery level, a "YES" result is obtained in step 5410, and control exits from this processing routine.

When a "NO" result has been obtained in step S404, the power-supply state is at a stage lower than the third stage, and in this case, the process proceeds to the process of step S405 and subsequent steps.

In step S405, a warning display showing that the remaining battery level has become insufficient is produced on the operation screen of the display monitor 208. For the warning display at this time, as described above, a message for prompting the user to connect an AC adapter or to replace a battery for the CD-R/RW drive unit 0 is output.

Then, in the process of the following steps S406 and S407, for example, in practice, waiting for the connection of an AC adapter or the replacement of a battery to be performed within a predetermined time period is done.

When the AC adapter is connected, a "YES" result is obtained in step S406. In this case, the process proceeds to step S408, whereby the second power saving mode which has been set in the processing progress thus far is released. Thereafter, the process proceeds to the data writing process of step S409.

If the battery has been replaced, a "YES" result is obtained in step S407, and the process returns to step S401.

In contrast, when neither the connection of the AC adapter, nor the replacement of the battery is performed, a "NO" result is obtained in step S407, and the process proceeds to the process of step S411 and subsequent steps.

In step S411, a determination is made as to whether or not recording data has been currently buffered in the cache memory 201a. When it is determined that the recording data has been buffered, the process of step S412 writes all the data within the cache memory, and the process proceeds to step S413. In contrast, when it is determined in step S411 that the recording data has not been buffered and a "NO" result is obtained, step S412 is skipped, and the process proceeds to step S413.

In step S413, a mode is set in which only reading is permitted and writing is prohibited. As a result, further writing of packet data is prohibited, and, for example, even if the user performs an operation for recording a new packet on the host computer 80, this will be cancelled.

In the following step S414, a determination is made as to whether or not the relation of the time Trm for which the operation can be continued>the boundary value 3 holds true. The boundary value 3 in this case is a value which is a boundary between the third stage and the fourth stage during battery driving. In particular, here, the value may be determined based on the time Trm for which the operation can be continued, which is sufficient for recording data for one packet in such a manner as to correspond to being packet writing.

When a "YES" result is obtained in this step S414, control exits from this process once, and, for example, the process returns to the initial step S401. As a result, for example, in the processing of steps S401 to S407, if the AC adapter is connected, the power saving mode is released, and it becomes possible to perform data writing. If the battery is replaced and the power-supply state of the second stage or higher is maintained, a data writing process becomes possible in a state in which the first or second power saving mode is set.

In contrast, when it is determined in step S414 that a "NO" result is obtained and the power-supply state of the fourth stage is reached, the process proceeds to step S415, whereby a forced closing process is performed.

As can be understood from the above description, in this embodiment, in a state in which the CD-R/RW drive unit 0 is battery-driven, initially, a power saving mode is set, and the performance of the CD-R/RW drive unit 0 is set to be lower than that when, for example, an AC adapter is connected. Furthermore, in this power saving mode, the performance can be decreased in a stepwise manner according to a decrease in the remaining battery level, thereby further reducing the power consumption.

Then, when the remaining battery level becomes low to such a degree that the time for which the operation can be continued of the CD-R/RW drive unit 0 becomes short, first, a warning display is produced so that the user is prompted to connect an AC adapter or to replace a battery, and a recording prohibition mode is set. As a result, for example, in the case of the DAO, TAO, or SAO, at this stage, the starting of data recording for a session (for one disk) or in units of tracks is prohibited. Also, in packet writing, when the remaining battery level becomes further lower from this state and the remaining battery level is decreased to such a degree that the time for which the operation can be continued, which is sufficient for newly recording data for one packet, cannot be obtained, for example, even if it is contrary to the intentions of the user, a forced closing process is performed on the packet data which has been recorded thus far.

As a result of obtaining such operations, in this embodiment, the time for which the operation can be continued can be increased, and the destruction of the data which has been recorded on the disk is prevented. In this embodiment, a transmission and reception of a battery information command is performed in a system in which the host computer 80 and the CD-R/RW drive unit 0 are connected with each other via a data interface, and based on this, the host computer 80 controls such operations.

The present invention is not limited to the above-described embodiments, and various modifications are possible. For example, in the above-described embodiment, a recording and playback apparatus for media, as for a CD-R/RW drive unit is used. Furthermore, the present invention can be applied to a disk drive unit having a recording and playback function which is compatible to, for example, only CD-Rs or CD-RWS. In addition, the present invention can also be applied to a recording and playback apparatus capable of performing a recording and playback corresponding to media, including, for example, MO disks, magnetic tape, magnetic disks, other than CD-Rs and CD-RWs. Furthermore, in response to this, as long as a recording method for media is changed, a closing process corresponding to this recording method may be performed.

In addition, for example, the present invention can be applied to a system formed of a combination of a peripheral device other than the recording and playback apparatus, and a host computer.

As has thus been described, in the present invention, in an operation of an information processing system in which a host computer such as an information processing apparatus and peripheral devices are connected so as to be capable of performing communication, the power-supply state on the peripheral device side can be issued to the host through the transmission and reception of, for example, battery information. Then, based on the contents of this battery information, the host performs control so that various operations, including an operation for recording and playing back data, are performed as appropriate.

As a result, for example, in the present invention, when the peripheral device side is battery-driven, it becomes possible to obtain a proper system operation corresponding to the remaining level of this battery, and the functions of the system are improved.

Here, the battery information is made to contain the time for which the operation can be continued, corresponding to predetermined operating conditions, during battery driving. That is, this may be viewed as information such that the remaining battery level is converted into the time for which the operation can be continued. As a result, for example, the host side need not be provided with the construction for computing the time for which the operation can be continued on the basis of the remaining battery level, and, the burden of the processing on the host side can be reduced correspondingly.

Furthermore, for this time for which the operation can be continued, the power consumption by various operating states on the peripheral device side, including the driving speed of a recording medium, is taken into account in addition to the remaining battery level and, therefore, the accuracy thereof becomes higher.

Furthermore, the type of power source which is currently in use and the temperature information of the power source are contained in the battery information, making diversified control based on this information possible.

Also, on the host side, when it is determined that the remaining battery level (the time for which the operation can be continued) of the peripheral device is less than or equal to a predetermined level on the basis of the contents stored in the received battery information, control is performed on the host side so that a warning is issued. As a result, for example, it becomes possible for the user to recognize that the remaining battery level has become zero. Thus, it is possible to ensure a safe power-supply state, for example, by connecting an AC adapter or by replacing a battery while the remaining battery level is still sufficient to such an extent that data recording and playback are performed without any trouble. As a result, this prevents a case in which the remaining battery level becomes zero, for example, in the middle of data recording and playback, and data recording and data playback are stopped improperly.

In addition, in this embodiment, the host performs control so that a recording limitation operation corresponding to the remaining battery level is performed, for example, in such a manner as to conform to a recording method in the peripheral device.

As a result, in the present invention, it is possible to prevent data recorded on a recording medium according to the features of the recording method from being destroyed.

For control corresponding to the remaining battery level during a recording operation, in a case in which it is determined that the remaining battery level of the peripheral device is less than or equal to a predetermined level, for example, on the basis of the contents stored in the received battery information, and that there is recording data to be transferred to the peripheral device side, all the recording data remaining in a data transfer memory (cache memory) is transferred to the peripheral device and is recorded thereby, so that subsequent recording of data on the peripheral device is stopped.

As a result, for example, thereafter, when a closing process is necessary as a result of the remaining battery level becoming almost zero, the closing process can be performed immediately. This also makes it possible to prevent the destruction of the data which is recorded on the recording medium. For example, when the transfer of recording data is performed in a state in which the remaining battery level is low, there are cases in which the reading and transfer of all the data written into the data transfer memory by the time the remaining battery level becomes zero and the operation stops is not in time. In this case, the data is not recorded properly on the disk and the processing is terminated.

On the host side as the information processing apparatus of the present invention, when the remaining battery level of the peripheral device is determined to be less than or equal to a predetermined level on the basis of the contents stored in the received battery information, for example, when it is determined that the remaining battery level it is decreased to such a degree that one time of data recording cannot be performed, a control process is performed so that a closing process for the data which has been recorded on the recording medium thus far is performed. That is, a closing process is performed forcedly before the remaining battery level becomes zero. As a result, the data which has been written onto the disk thus far is managed as being properly recorded. That is, the data recorded on the recording medium is protected.

In this manner, in the present invention, a system operation which has hitherto been considered not to exist can be obtained through the transmission and reception of battery information showing the power-supply state between the peripheral device and the host. In particular, an operation for protecting the data recorded on a recording medium, which corresponds to the remaining battery level of the recording and playback apparatus, is obtained.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information processing system comprising:
   an information processing apparatus including:
   a recording and/or reproducing unit for recording data into a recording medium and/or for reading data from the recording medium;
   a power-supply unit capable of supplying internal power by using a battery;
   a power-supply information creation unit for creating power-supply information in which remaining battery level information about said power-supply unit is stored; and
   a control unit for performing a control process for limiting a data recording operation in such a manner as to comply with each recording method which is possible by said information processing apparatus in accordance with the remaining battery level information, which is obtained based on the power-supply information.

2. The information processing system according to claim 1, further comprising another information processing apparatus that sends a signal for controlling operation of said information processing apparatus to the information processing apparatus based on the received power-supply information.

3. The information processing system according to claim 1, further comprising another information processing apparatus that includes an operation section to which external instructions are input.

4. The information processing system according to claim 1, wherein said power-supply information creation unit determines a time for which an operation can be continued corresponding to each of predetermined operation conditions of the information processing apparatus in which power is supplied by the battery, and can store information indicating a time for which predetermined operation can be continued in said power-supply information.

5. The information processing system according to claim 1, wherein said power-supply information creation unit can store, in said power-supply information, used-power-supply type information, obtained by identifying a type of power-supply source currently in use as said power-supply unit.

6. The information processing system according to claim 1, wherein said controller performs control in such a way that, when it is determined that a remaining battery level of said information processing apparatus is less than or equal to a predetermined level based on the received power-supply information, a warning is issued by said another information processing apparatus.

7. The information processing system according to claim 1, wherein said controller performs a control to place said information processing apparatus in a write-prohibited, read-only permission mode upon detecting a battery level below a predetermined limit.

8. An information processing apparatus comprising:
   a recording/reproducing unit for recording data into an information recording medium and/or for reading data from the information recording medium;
   a power-supply unit capable of supplying internal power using at least a battery;
   a power-supply information creation unit for creating power-supply information in which predetermined information about said power-supply unit is stored;
   an information transmitter for transmitting said power-supply information to another information processing apparatus; and
   a controller for controlling internal operation based on control information transmitted from said another information processing apparatus, wherein said controller performs a control operation for limiting a data recording operation in such a manner as to comply with a recording method of said recording/reproducing unit in such a manner as to correspond to a predetermined recording medium in accordance with control information sent out from said another information processing apparatus based on the power-supply information.

9. The information, processing apparatus according to claim 8, wherein said power-supply information creation unit determines a time for which operation can be continued, corresponding to predetermined operation conditions of the information processing apparatus, in a state in which power is supplied by the battery, and can include information indicating the time for which the operation can be continued in said power-supply information.

10. The information processing apparatus according to claim 8, wherein said power-supply information creation unit can include, in said power-supply information, used-power-supply type information obtained by identifying a type of power-supply source currently in use as said power-supply unit.

11. The information processing apparatus according to claim 8, wherein predetermined information in said power-supply information has a validity flag indicating a validity/invalidity of information content thereof, and said power-supply information creation unit sets said validity flag.

12. The information processing apparatus according to claim 8, wherein said power-supply information creation unit includes, in said power-supply information, power-supply temperature information obtained by measuring a temperature of said power-supply unit.

13. The information processing apparatus according to claim 8, wherein said controller performs a control to place said information processing apparatus in a write-prohibited, read-only permission mode upon detecting a battery level below a predetermined limit.

14. An information processing apparatus comprising:
- a recording/reproducing unit for recording data into an information recording medium and/or for reading data from the information recording medium;
- a power supply unit using at least a battery; and
- a controller for performing control so that a predetermined operation is performed in the information processing apparatus and/or another information processing apparatus based on power-supply information in which predetermined information about the power supply unit is included, said power-supply information being transmitted from said another information processing apparatus, wherein said controller performs a control process for limiting a data recording operation in such a manner as to comply with each recording method which is possible by said recording/reproducing unit in accordance with the remaining battery level.

15. The information processing apparatus according to claim 14, wherein said controller performs control so that a warning is issued in the information processing apparatus when it is determined that a remaining battery level less than or equal to a predetermined level based on said power-supply information.

16. The information processing apparatus according to claim 14, wherein said controller performs a control process so that recording data remaining in a data transferring memory is transferred, so as to cause recording to be performed in said another information processing apparatus, and subsequent recording of data in said another information processing apparatus is stopped when it is determined that a remaining battery level of said battery is less than or equal to a predetermined level, and when it is determined that there is recording data to be transferred to said another information processing apparatus.

17. The information processing apparatus according to claim 14, wherein said controller preforms a control process so that a process for closing data, which has been recorded on the recording medium thus far, is performed when it is determined that a remaining battery level of said other information processing power supply unit is less than or equal to a predetermined level.

18. The information processing apparatus according to claim 14, wherein said controller instructs an operation in said another information processing apparatus by sending a control signal to said another information processing apparatus.

19. The information processing apparatus according to claim 14, wherein said controller performs a control to place said information processing apparatus in a write-prohibited, read-only permission mode upon detecting a battery level below a predetermined limit.

20. An information processing method for use in an information processing apparatus comprising the steps of:
- recording data into a recording medium and/or reading data from said recording medium;
- supplying internal power using a power-supply;
- creating and storing power-supply information related to remaining battery level information about said power-supply; and
- performing a control process for limiting a data recording operation in such a manner as to comply with each recording method which is possible by said information processing apparatus in accordance with the remaining battery level information, which is obtained based on the power-supply information.

* * * * *